(12) United States Patent
Blom-Schieber et al.

(10) Patent No.: US 12,240,178 B1
(45) Date of Patent: Mar. 4, 2025

(54) LAYUP STRATEGY ANALYSIS

(71) Applicant: THE BOEING COMPANY, Chicago, IL (US)

(72) Inventors: Adriana Willempje Blom-Schieber, Shoreline, WA (US); Troy Winfree, Seattle, WA (US); Philip Lyle Stubblefield, Federal Way, WA (US); Rainer J. Romatka, Bellevue, WA (US)

(73) Assignee: THE BOEING COMPANY, Arlington, VA (US)

( * ) Notice: Subject to any disclaimer, the term of this patent is extended or adjusted under 35 U.S.C. 154(b) by 874 days.

(21) Appl. No.: 16/905,026

(22) Filed: Jun. 18, 2020

(51) Int. Cl.
| | |
|---|---|
| *B29C 64/386* | (2017.01) |
| *B29C 64/118* | (2017.01) |
| *B29C 65/00* | (2006.01) |
| *B29C 70/38* | (2006.01) |
| *B33Y 50/00* | (2015.01) |
| *G05B 19/4099* | (2006.01) |

(52) U.S. Cl.
CPC ........ *B29C 64/386* (2017.08); *B29C 66/9221* (2013.01); *B29C 66/96* (2013.01); *B29C 70/382* (2013.01); *B29C 70/384* (2013.01); *B33Y 50/00* (2014.12); *G05B 19/4099* (2013.01); *B29C 64/118* (2017.08); *B29C 66/90* (2013.01); *B29C 66/9241* (2013.01)

(58) Field of Classification Search
None
See application file for complete search history.

(56) References Cited

U.S. PATENT DOCUMENTS

| | | | |
|---|---|---|---|
| 7,747,421 B2 * | 6/2010 | Tang | G05B 19/40938 703/7 |
| 8,560,103 B2 * | 10/2013 | Kubli | G06F 30/00 700/145 |

(Continued)

FOREIGN PATENT DOCUMENTS

| | | |
|---|---|---|
| EP | 3078471 A1 | 10/2016 |
| EP | 2749869 B1 | 4/2019 |

OTHER PUBLICATIONS

Blom, A.W., "Structural Performance of Fiber-Placed, Variable-Stiffness Composite Conical and Cylindrical Shells," Wohrmann Print Service, Zutphen, The Netherlands, 2010, pp. 264.

(Continued)

*Primary Examiner* — Barbara J Musser
(74) *Attorney, Agent, or Firm* — Moore IP Law

(57) ABSTRACT

A layup strategy analysis tool including a memory storing layup strategy analysis instructions and one or more processors configured to execute the layup strategy analysis instructions. During execution, the layup strategy analysis instructions obtain model data representing a three-dimensional (3D) model of an object to be formed using an automated fiber placement process. The layup strategy analysis instructions also obtain process data descriptive of the automated fiber placement process and one or more automated fiber placement machines. The layup strategy analysis instructions also generate output indicating a count of a number of tows that can be simultaneously applied during a single pass based on a geometry of the object and based on manufacturability constraints indicated by the process data.

23 Claims, 15 Drawing Sheets

(56) References Cited

U.S. PATENT DOCUMENTS

| | | | |
|---|---|---|---|
| 9,545,759 | B2 | 1/2017 | Yarker et al. |
| 10,549,491 | B2 | 2/2020 | Blom-Schieber et al. |
| 10,654,228 | B2 | 5/2020 | Drumheller |
| 10,670,394 | B2 | 6/2020 | Winfree et al. |
| 2007/0187024 | A1 | 8/2007 | Johnson et al. |
| 2009/0148647 | A1 | 6/2009 | Jones et al. |
| 2009/0321985 | A1 | 12/2009 | Aguado et al. |
| 2014/0177936 | A1 | 6/2014 | Toledano |
| 2014/0288893 | A1 | 9/2014 | Blom et al. |
| 2014/0330420 | A1 | 11/2014 | MacLean |
| 2016/0063137 | A1 | 3/2016 | Flory et al. |
| 2016/0082672 | A1 | 3/2016 | Munaux |
| 2016/0121557 | A1 | 5/2016 | Munaux |
| 2016/0121558 | A1 | 5/2016 | Munaux et al. |
| 2016/0221271 | A1 | 8/2016 | Yarker et al. |
| 2018/0372488 | A1 | 12/2018 | Winfree et al. |
| 2019/0070800 | A1* | 3/2019 | Blom-Schieber ..... B29C 70/545 |
| 2019/0389150 | A1 | 12/2019 | Louie et al. |

OTHER PUBLICATIONS

De Goes, Fernando et al., "Vector Field Processing of Triangle Meshes," SA '15: SIGGRAPH Asia 2015 Courses, Nov. 2015, Article No. 17, https://doi.org/10.1145/2818143.2818167, pp. 1-48.
CGTECH, "Programming & Simulation Software for Automated Fiber Placement (AFP) & Tape Laying (ATL)", Vericut Composite Applications Brochure, accessed Apr. 4, 2017, 3 pages.<http://www.cgtech.com/wp-content/uploads/resources/brochures/VERICUT_Composite_Brochure.pdf.
European Search Report for Application No. 18182259.4 mailed Dec. 17, 2018, 6 pgs.
Hasenjaeger, "Programming and Simulating Automated Fiber Placement (AFP) CNC Machines", Sampe Journal, Nov./Dec. 2013, vol. 49, No. 6, 8 pages.

* cited by examiner

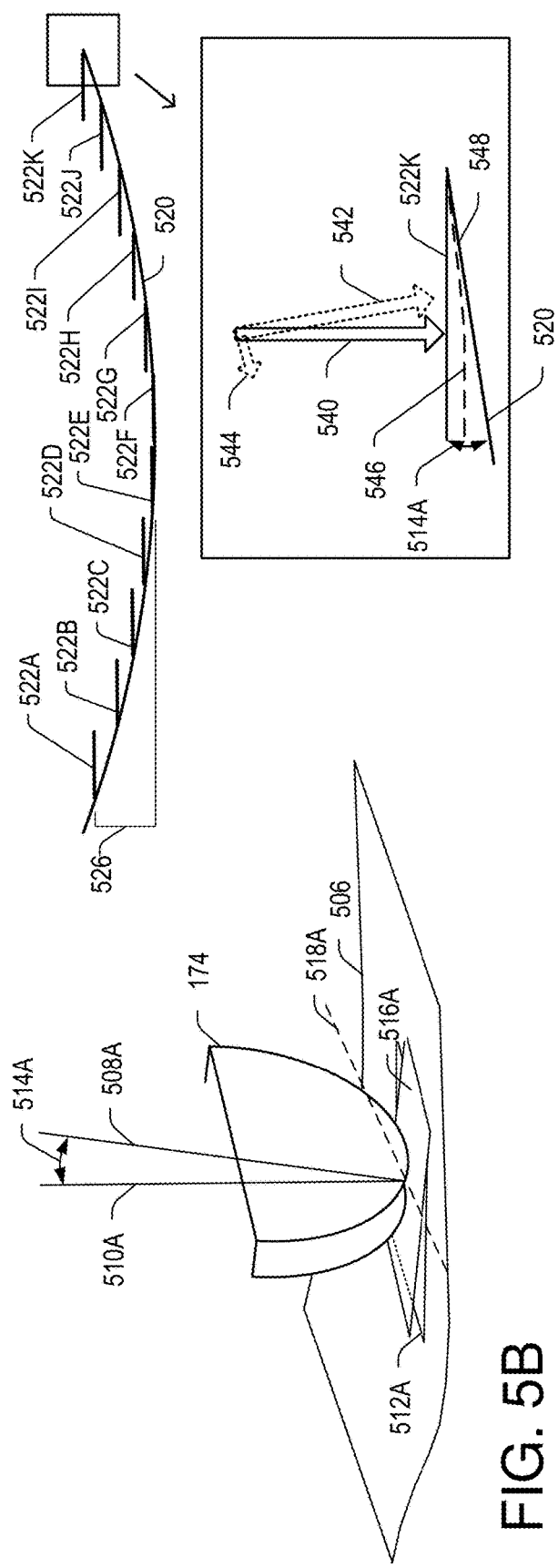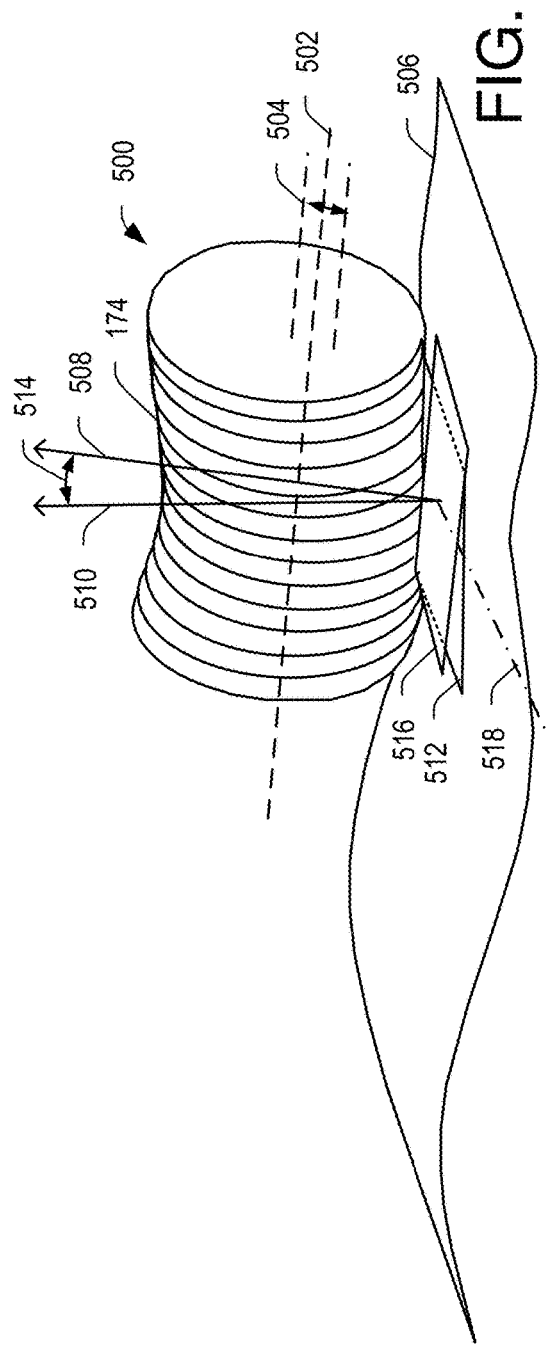

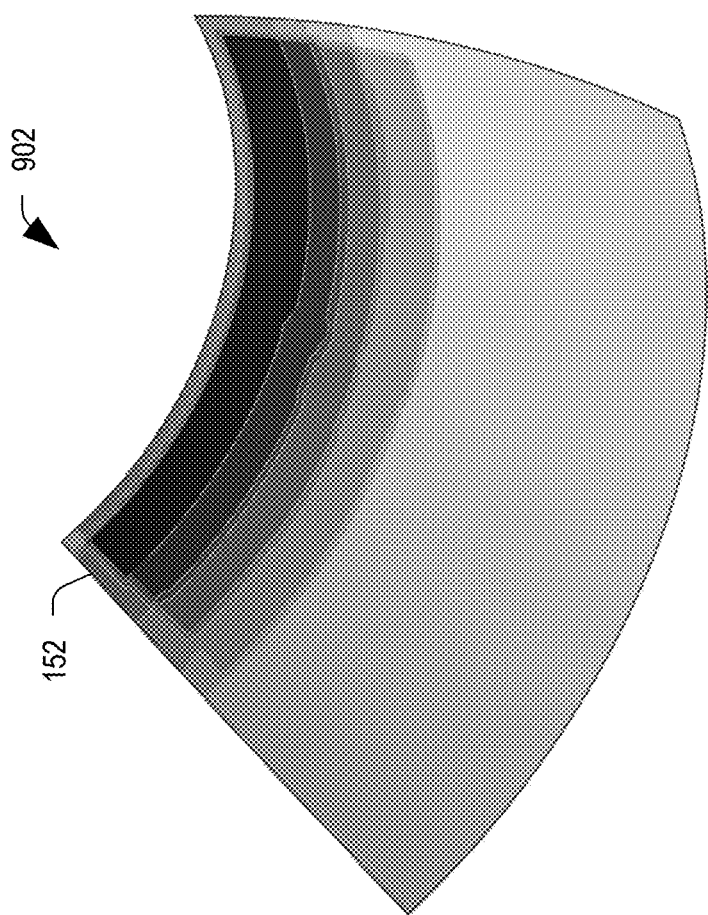
FIG. 9A

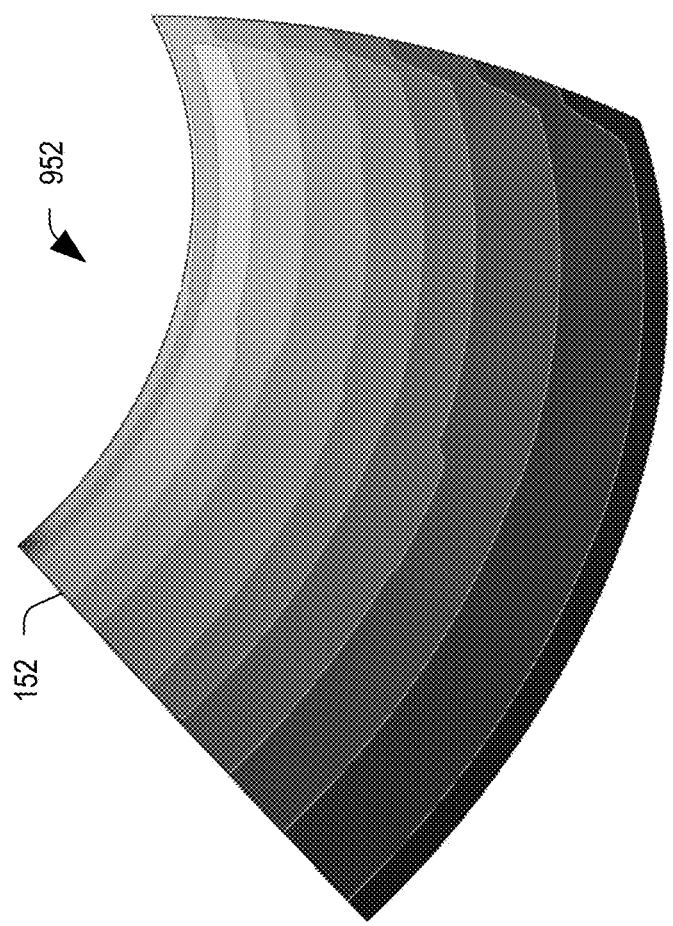
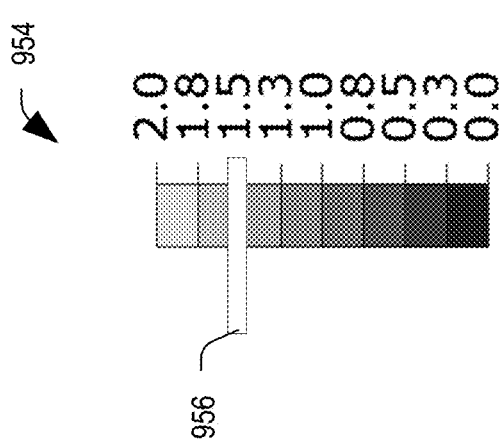
FIG. 9B

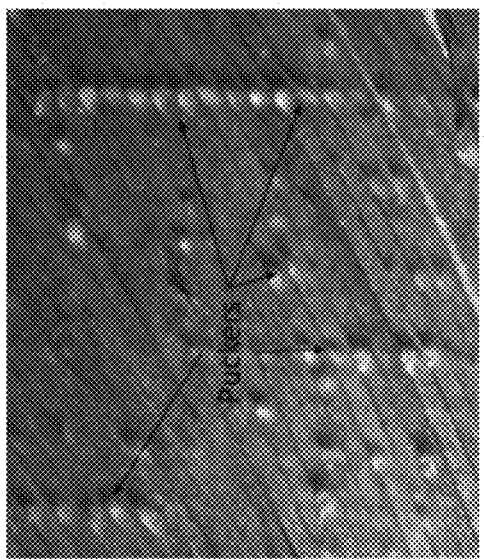
FIG. 11B
FIG. 11C
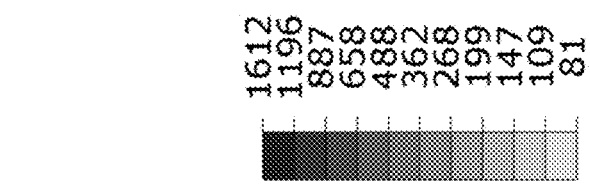
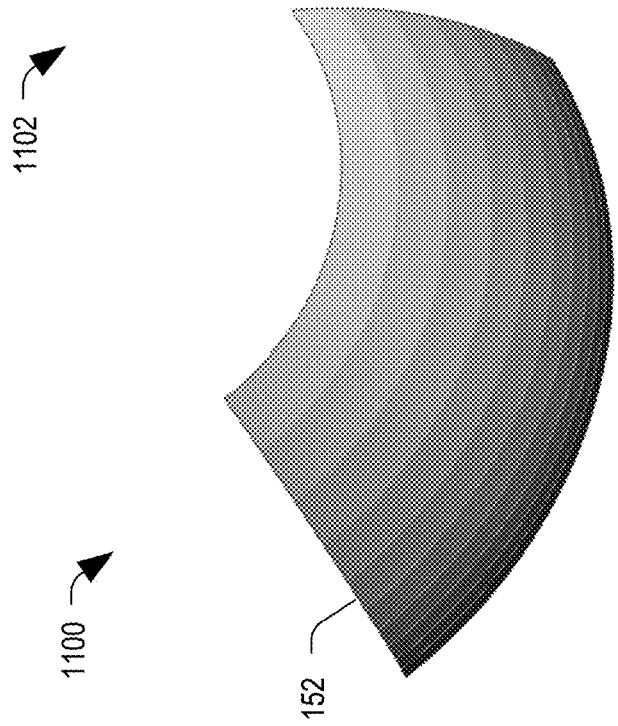
FIG. 11A

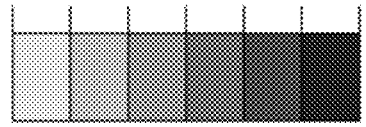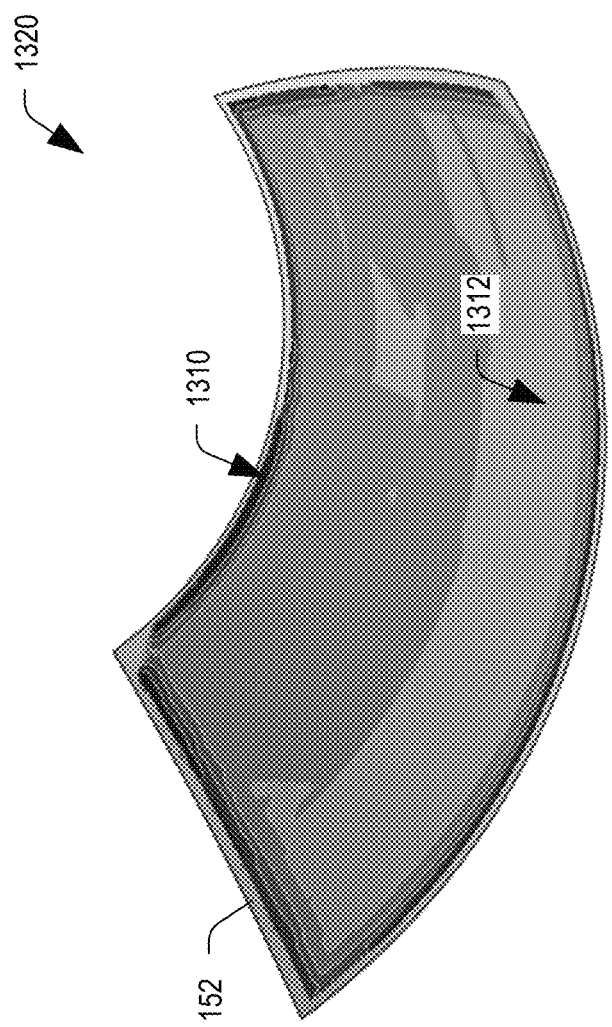
FIG. 13B

LAYUP STRATEGY ANALYSIS

FIELD OF THE DISCLOSURE

The present disclosure is generally related to analysis of layup strategies for automated fiber placement manufacturing processes.

BACKGROUND

Advanced (or automated) fiber placement (AFP) refers to automation of some steps of a process of manufacturing fiber reinforced polymer laminates. Each layer formed during an AFP process typically includes multiple courses, and each course typically includes multiple tows of resin impregnated fiber material. Material properties of laminates formed in this way vary based on the orientation angle of the fibers. To illustrate, a laminate part may have a greater tensile strength along a direction parallel to the fibers than the tensile strength along a direction perpendicular to the fibers. Thus, for some applications, it may be important for an as-built laminate part to have fibers that are oriented in a particular manner specified during design.

Constraints associated with AFP manufacturing place certain limitations on manufacturing laminate parts with complex shapes while maintaining specified fiber angle orientations. For example, to produce laminate parts efficiently, an AFP machine generally has a fiber placement head with one or more rollers that press fibers (in the form of tows) onto a working surface (e.g., a mandrel or a previously formed layer of fibers) of the laminate. For some shapes, the roller(s) may not be able to press all of the fibers onto the working surface with sufficient pressure to ensure cohesion (to previously formed layer of fibers) or adhesion (to a mandrel). As another example, depending on where a tow starts, the tow may need to change directions (e.g., turn) one or more times to keep the fibers aligned with the as-designed fiber orientation; however, such turns can cause compression within the tow, resulting in folds, puckers, or other flaws in the laminate. Some fiber placement and orientation concerns can be addressed by using fewer and smaller tows; however, using fewer or smaller tows increases manufacturing time since it takes longer to build up each layer.

SUMMARY

In a particular implementation, a layup strategy analysis tool includes a memory storing layup strategy analysis instructions and one or more processors configured to execute the layup strategy analysis instructions. During execution, the layup strategy analysis instructions obtain model data representing a three-dimensional (3D) model of an object to be formed using an automated fiber placement process. During execution, the layup strategy analysis instructions also obtain process data descriptive of the automated fiber placement process and one or more automated fiber placement machines. During execution, the layup strategy analysis instructions further generate output indicating a count of a number of tows that can be simultaneously applied during a single pass based on a geometry of the object and based on manufacturability constraints indicated by the process data.

In another particular implementation, a method includes obtaining, at one or more processors of a computing device, model data representing a 3D model of an object to be formed using an automated fiber placement process. The method also includes obtaining, at the one or more processors, process data descriptive of the automated fiber placement process and one or more automated fiber placement machines. The method further includes performing, by the one or more processors, an analysis of the model data and the process data to determine a count of a number of tows that can be simultaneously applied during a single pass based on a geometry of the object and based on manufacturability constraints indicated by the process data. The method also includes generating, by the one or more processors, output based on the analysis. The output includes a depiction of the 3D model of the object displayed in a manner that visually distinguishes problem locations of the 3D model based on differing analysis results associated with each location.

In another particular implementation, a computer-readable storage device stores instructions that, when executed by one or more processors, cause the one or more processors to initiate, perform, or control operations including obtaining model data representing a 3D model of an object to be formed using an automated fiber placement process. The operations also include obtaining process data descriptive of the automated fiber placement process and one or more automated fiber placement machines. The operations further include performing an analysis based on a geometry of the object indicated by the model data, nominal fiber orientations for one or more layers indicated by the model data, and manufacturability constraints indicated by the process data. The operations also include generating output based on the analysis. The output includes a depiction of the 3D model of the object displayed in a manner that visually distinguishes problem locations of the 3D model based on differing analysis results associated with each location.

The features, functions, and advantages described herein can be achieved independently in various implementations or may be combined in yet other implementations, further details of which can be found with reference to the following description and drawings.

BRIEF DESCRIPTION OF THE DRAWINGS

FIGS. 5A, 5B, and 5C are diagrams that illustrate roller compaction related layup strategy analysis concerns according to a particular implementation.

FIG. 9A is a diagram that illustrates an example of a portion of a display of a 3D model of an object with visually distinct locations associated with layup strategy analysis results related to fiber angles.

FIG. 9B is a diagram that illustrates an example of a portion of a display of a 3D model of another object with visually distinct locations associated with layup strategy analysis results related to fiber angle deviation within a course.

FIG. 11A is a diagram that illustrates an example of a portion of a display of a 3D model of an object with visually distinct locations associated with layup strategy analysis results related to steering.

FIGS. 11B and 11C are images that illustrate examples of steering related effects.

FIGS. 13A and 13B are diagrams that illustrate examples of portions of a display of a 3D model of an object with visually distinct locations associated with layup strategy analysis results related to a number of tows that can be simultaneously applied during a single pass.

DETAILED DESCRIPTION

Figure 1:
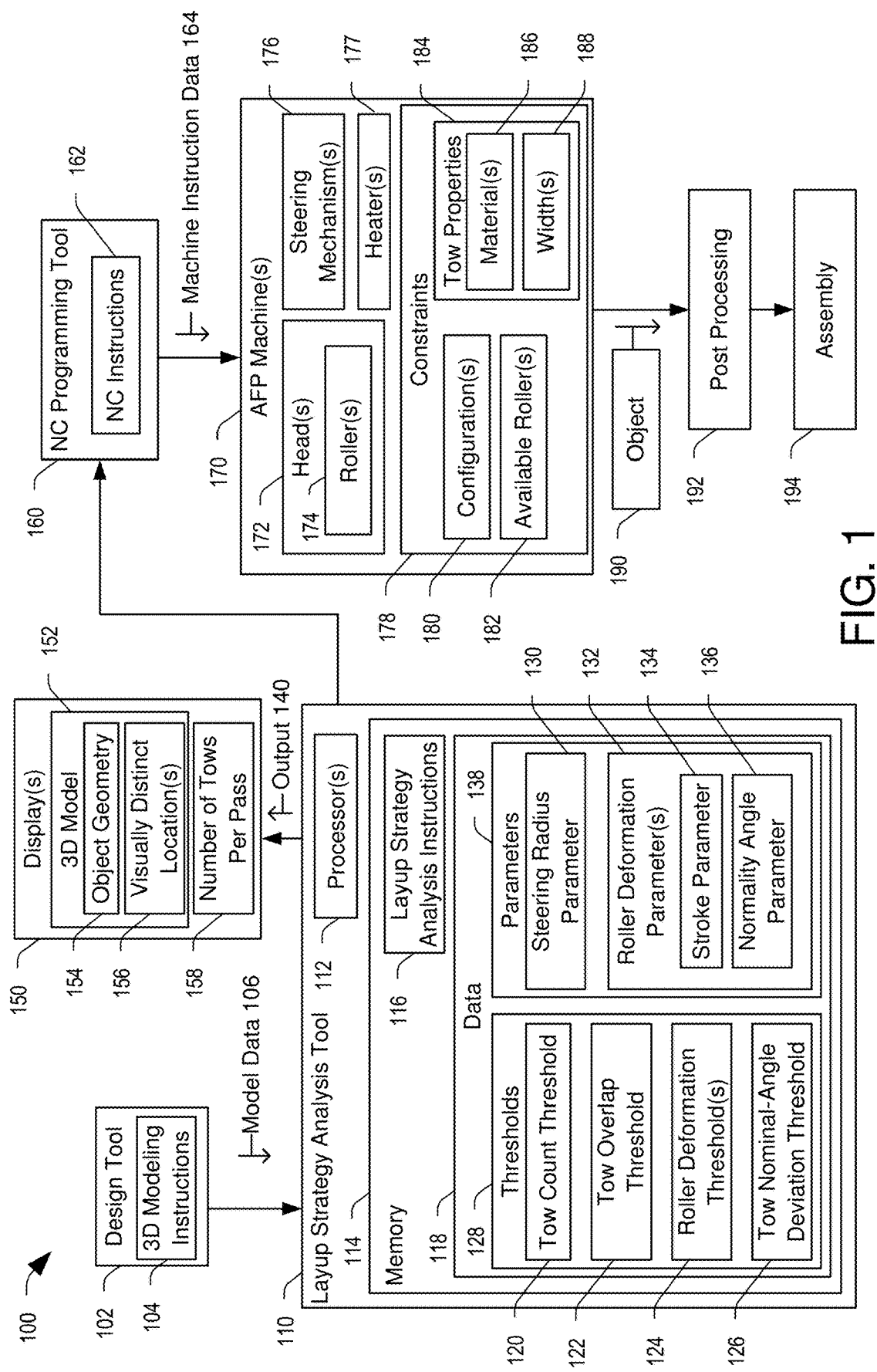
FIG. 1 is a block diagram that illustrates an example of an AFP manufacturing system that includes a layup strategy analysis tool according to a particular implementation.

Aspects disclosed herein present systems and methods for layup strategy analysis and planning. Analysis of layup strategies for manufacturing a particular object using AFP can have significant impact on manufacturing operations, on post-layup inspection and rework, and on laminate quality (e.g., fiber angle distributions, gaps/laps, etc.).

The layup strategy analyses disclosed herein enable production of laminates that have higher quality with less rework and faster manufacturing timelines. The disclosed analyses consider AFP layup parameters such as: a number of tows to be applied per course, a tow width, a course centerline strategy, a tow mask, ply stagger, course layup direction, course sequencing, etc. Selection of these parameters influences in-process cycle times, time spent on inspection and rework, post-processing cycle times, and laminate quality. For example, it is generally faster to manufacture a laminate by applying parallel courses with a large number of wide tows and without steering than it would be to manufacture the same laminate using non-parallel courses, fewer tows per course, narrower tows, or a different steering strategy. Further, while these parameters can be selected more or less independently in some situations, such as to manufacture a large flat object, in some circumstances the selection of one of these parameters influences the selection of one or more other parameters. For example, the selection of a steering strategy may limit the width of tows that can be used. Additionally, in many instances, the geometry of the object to be manufactured is such that parallel courses cannot be applied in a manner that follows a natural path (e.g., without steering). Further, fiber angles of applied courses may diverge from the as-designed fiber angles for various reasons, which may lead to steering of courses, nonparallel courses, or both, or narrower courses to meet fiber angle requirements.

The layup strategy analyses are performed by a software tool executed by one or more processors of a computing device. During execution, the software tool evaluates manufacturability of a composite part based on a 3D model of the part generated during a part design process. The software tool generates a graphical user interface (GUI) to improve part design and AFP process decisions. For example, the GUI may include visualizations of the impact of various part design changes, AFP processing parameters, or both. The software tool uses the 3D model of the object to be manufactured and can be used early in the design process, such as before numerical control (NC) programming of AFP manufacturing tools is performed. NC programming entails generating detailed machine instructions for the AFP process, including, for example, designating course starting locations and course centerlines, which is a time consuming process. In contrast, the layup strategy analyses disclosed herein can generate output indicating best and worst case scenarios for manufacturability of the objects, indicting how changes in course width affect angle deviations and/or compaction, etc., without providing the detailed input needed for NC programming. Results of the analyses can be indicated on or with a visual depiction of the 3D model (e.g., a heat map display) to visually distinguish locations of concern.

The layup strategy analyses result in better part designs and better AFP manufacturing process designs, which can reduce manufacturing time and cost. In this context, manufacturing time and cost includes not just time and expense associated with laying up fibers to form the part, but also time and expense associated with rework, inspection, and post-processing. For example, APF manufacturing sometimes results in placement of one or more tows in a course that are manually adjusted or inspected before the next course or ply is applied. Manual adjustment, inspection, and other so-called "out-of-cycle" processes do not affect "in-cycle" time of the AFP manufacturing process since the equipment is not in operation; however, these manual adjustment and inspection processes are very expensive in terms of labor costs and significantly delay the total, end-to-end manufacturing time of the part. To illustrate, by some estimates, rework and other out-of-cycle processes contribute up to 40% to the total, end-to-end manufacturing time of some parts. The disclosed layup strategy analyses enable detection of such concerns in the design stage so that different AFP manufacturing choices or part design changes can be selected to limit or avoid use of these manual adjustment and inspection processes.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation.

As a result, this disclosure is not limited to the specific embodiments or examples described below, but by the claims and their equivalents.

Particular implementations are described herein with reference to the drawings. Common features are designated by common reference numbers throughout the drawings and description. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 5C, multiple tows are illustrated and associated with reference numbers 522A, 522B, 522C, 522D, 522E, 522F, 522G, 522H, 522I, 522J, and 522K. When referring to a particular one of these tows, such as the tow 522A, the distinguishing letter "A" is used. However, when referring to any arbitrary one of these tows or to these tows as a group, the reference number 522 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a layup strategy analysis tool 110 that includes one or more processors ("processor(s)" 112 in FIG. 1), which indicates that in some implementations the layup strategy analysis tool 110 includes a single processor 112 and in other implementations the layup strategy analysis tool 110 includes multiple processors 112. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a block diagram that illustrates an example of a system 100 including multiple tools used during design and manufacture of an object 190 using automated fiber placement. In the example illustrated in FIG. 1, the tools include a design tool 102, a layup strategy analysis tool 110, an NC programming tool 160, one or more AFP machines 170, and tools to perform post-processing 192 and assembly 194. In other examples, the system 100 includes more tools, fewer tools, or different tools. For example, in some implementations, the design tool 102 and the layup strategy analysis tool 110 are combined in a single tool, such as a computing device that includes both 3D modeling instructions 104 and layup strategy analysis instructions 116. As another example, in some implementations, the system 100 also includes out-of-cycle manufacturing or inspection tools, such as manual workstations to detect or correct AFP manufacturing defects.

In FIG. 1, the design tool 102, the layup strategy analysis tool 110, and the NC programming tool 160 include or correspond to computing devices configured to execute software instructions to perform various operations. Each such computing device includes one or more processors and one or more memory devices, such as the processor(s) 112 and memory 114 of the layup strategy analysis tool 110. In some implementations, one or more of the computing devices also, or alternatively, include other hardware, such as an application-specific integrated circuit (ASIC) or a field-programmable gate array (FPGA), to perform the functions described below. The memory device(s) of the computing devices includes volatile memory devices (e.g., random access memory (RAM) devices), nonvolatile memory devices (e.g., read-only memory (ROM) devices, programmable read-only memory, and flash memory), or both. Although specific instructions are described with reference to each computing device, the memory device(s) of each computing device may also store other instructions and data, such as an operating system, other programs, and program data. Each memory device includes or corresponds to a non-transitory, computer-readable storage device (i.e., is not merely a signal). Further, each computing device can include other hardware, such as network interfaces, input/output interfaces, input/output device, etc.

Each of the AFP machine(s) 170 includes components to enable the respective AFP machine 170 to build up multiple layers of fiber reinforced polymer material to form a part, such as the object 190. In the example illustrated in FIG. 1, each AFP machine 170 includes one or more heads 172, and each head 172 includes one or more rollers 174. Additionally, each of the AFP machines 170 of FIG. 1 includes one or more steering mechanisms 176 and one or more heaters 177. Each head 172 is coupled to a steering mechanism 176 which moves the head 172 to direct application of one or more tows to an in-process part or a mandrel to form a course. The heaters 177 heat the tows before, during, or after application to increase tackiness of the tows so that the tows adhere to or cohere to the working surface. The heaters 177 include, for example, infrared heaters, hot gas blowers, lasers, etc. Multiple courses can be applied to form a layer or ply, and multiple layers can be formed to generate the part. The steering mechanisms 176 include, for example, robotic arms, gantries, movable platforms, or other devices to move the head 172 of the AFP machine 170 relative to the mandrel or in-process part.

In a particular implementations, a head 172 of an AFP machine 170 includes multiple rollers 174, each of which is configured to press (e.g., apply compaction force to) a tow onto a working surface of the mandrel or the in-process part to adhere (or cohere) the tow to the working surface. The steering mechanism 176 moves the head 172 on a path that defines or is characterized by a course centerline. As the head 172 moves, the rollers 174 of the head 172 can move or deform, within a relatively narrow range, to press the tows onto the working surface. The amount that each roller 174 can move or deform depends on the configuration of the roller 174, the configuration of the head 172, or both. For example, a roller 174 formed of a softer material may be capable of deforming more during use than a roller 174 formed of a firmer material. Additionally, the mechanism(s) used to couple the rollers 174 to the head 172 can influence how the rollers 174 are able to move relative to one another. As a result of the movement and deformation of the rollers 174, the head 172 is able to apply sufficient compaction force to each of multiple tows of a course despite steering of the head 172, curvature of the working surface, or both, within particular limits. As the curvature of the working surface increases, the head 172 is able to apply fewer tows in a single pass due to differences in compaction force across the head 172 (as well as other concerns), as described further with reference to FIGS. 5A-5C. As the amount of steering needed to follow the course centerline increases, narrower tows may be used due to stresses induced in tows.

Each AFP machine 170 is associated with manufacturability constraints 178, such as steering parameters, compaction parameters, tow add/drop parameters, etc., that limit operations that can be performed by the APF machine 170 without causing defects in the part. To illustrate, a particular tow material 186 with a particular tow width 188 has a minimum steering radius and another material with the same tow width or the same material with another tow width 188 may have a different minimum steering radius, based on the material properties and process settings. The manufacturability constraints 178 depend on configurations 180 of the AFP machines 170, available rollers 182 (e.g., rollers 174 that can be used by the AFP machine 170), tow material 186, and tow width 188, and possibly other factors. For example, in a first configuration, a particular AFP machine 170 may have a heater 177 that enables a first minimum steering radius, and in a second configuration, the AFP machine 170 may have a different heater 177 that enables a second (e.g. different) minimum steering radius. As another example, a particular AFP machine 170 can be used with first available rollers 182 to provide first compaction parameters or can be used with second available rollers 182 to provide second (e.g., different) compaction parameters.

In the example illustrated in FIG. 1, the manufacturability constraints include tow properties 184, such as the material(s) 186 of the tows and the width(s) 188 of the tows. The material(s) 186 of the tows may require, for example, a certain compaction force to ensure cohesion of the tow to the working surface and limit the tension that can be applied to a tow without delamination from the working surface. The width(s) 188 of the tows limit, for example, a turning radius of a tow. To illustrate, a narrower tow can be properly applied to the working surface through a curve with a smaller turning radius than can a wider tow.

In some implementations, an AFP process designer may have access to multiple AFP machines 170 that could be used to form a part (e.g., the object 190), to multiple distinct types of tows that could be used to form the part, to an AFP machine 170 that can be reconfigured to multiple different configuration 180 or used with different available rollers 182 to form the part, or a combination thereof. The layup strategy analyses performed by the layup strategy analysis tool 110 can be used to assist the AFP process designer in selecting and configuring (e.g., optimizing) an AFP process to form the part. Additionally, or alternatively, the layup strategy analyses performed by the layup strategy analysis tool 110 can be used to assist a part designer in designing a part (e.g., the object 190) that is well suited (e.g., optimized) for manufacturing using available AFP machines 170 or machine configurations and available tow widths.

The design tool 102 is configured to execute the 3D modeling instructions 104 to generate model data 106 which can be rendered to display a 3D model 152 of the object 190. The model data 106 includes data representing as-designed features of the object 190. To illustrate, the model data 106 describes as-designed object geometry 154 of the object 190 and may also describe other as-designed features of the object 190, such as fiber angles, materials, mechanical properties, material properties, etc. The 3D modeling instructions 104 enable a user to render the 3D model 152 for visualization purposes and enable the user to edit or revise aspects of the design of the object 190. In some implementations, the 3D modeling instructions 104 include or are associated with instructions that are executable to analyze properties of the 3D model 152, such as to determine mechanical properties of the 3D model 152 based on the object geometry 154 and as-designed material properties.

The processor(s) 112 of the layup strategy analysis tool 110 execute the layup strategy analysis instructions 116 to obtain (e.g., retrieve, receive, read from memory, etc.) the model data 106 representing the 3D model 152. The layup strategy analysis tool 110 may also obtain process data descriptive of the AFP machine(s) 170, an AFP process that can be performed using one or more of the AFP machine(s) 170, or both. The layup strategy analysis instructions 116 are executable to perform a variety of analyses based on the obtained data and to generate output 140 indicating results of the analyses. For example, the layup strategy analysis tool 110 may determine a count of a number of tows that can be simultaneously applied by the AFP machine 170 during a single pass based on the object geometry 154 and the obtained data. In another example, the layup strategy analysis tool 110 may identify problem locations based on the object geometry 154, nominal fiber orientations indicated by the model data 106, and other data, such as the manufacturability constraints 178.

In some implementations, results of the analyses performed by the layup strategy analysis instructions 116 are provided as output 140 to a display 150 in a manner that visually distinguishes the results, such as by highlighting problem locations of the 3D model 152. To illustrate, in FIG. 1, the display 150 includes a graphical user interface depicting the 3D model 152 to show the object geometry 154. Additionally, the 3D model 152 in FIG. 1 includes one or more visually distinct locations 156 to illustrate analysis results from the layup strategy analysis instructions 116. The display 150 can also, or in the alternative, depict other information. For example, in FIG. 1, the display includes an indication of a number of tows per pass 158 that can be applied by the AFP machine 170 based on the analysis results.

In FIG. 1, the memory 114 includes data 118 that may be used for various analyses performed by the layup strategy analysis instructions 116. The data 118 in FIG. 1 includes one or more thresholds 128, such as a tow count threshold 120, a tow overlap threshold 122, a roller deformation threshold 124, and a tow nominal-angle deviation threshold. Each threshold represents a value or condition that is considered a minimum or maximum acceptable value under the particular circumstances being analyzed. The threshold(s) 128 may be set by a user initiating or controlling the analysis, set based on design criteria or manufacturing criteria, or may include default values.

In a particular implementation, the tow count threshold 120 indicates a desirable (maximum) number of tows to be applied simultaneously in a course. As explained above, successful application of more tows per course tends to decrease the manufacturing time of the object 190. However, if a course includes too many tows, one or more of the tows may not be successfully applied, leading to inspection and rework, which tend to increase the manufacturing time of the object 190. A value of the tow count threshold 120 can be assigned to assist the user in identifying portions of the 3D model 152 that correspond to portions of the object 190 where a course or courses will need to use fewer tows than is desirable. For example, the analysis performed by the layup strategy analysis instructions 116 identifies a number of tows that can be applied at each location on the 3D model 152, and any portion(s) of the 3D model 152 where the count of tows that can be simultaneously applied fails to satisfy the tow count threshold 120 are visually distinguished in the display 150 (e.g., indicated as visually distinct locations 156 on the object geometry 154).

In a particular implementation, the tow overlap threshold 122 indicates a constraint on an overlap metric. The overlap metric is indicative of how much two or more fiber paths (e.g., tows or courses) of a single layer overlap as they converge and diverge. The overlap metric is indicative of how much tow cutting or adding should occur while applying a course. When two tows of a layer overlap, the layer is thicker than intended, which leads to rework and/or geometry abnormalities in the as-built part. To avoid or limit such overlap, one or more tows can be cut (or added) as a course is applied; however, cutting or adding tows results in gaps or overlaps (also referred to as "laps") between tows of the layer and generally slows down the manufacturing process. Additionally, such gaps or laps may also lead to lower strength values, requiring more material to achieve the desired load carrying capability of the structure. A value of the tow overlap threshold 122 can be assigned to assist the user in identifying portions of the 3D model 152 that correspond to portions of the object 190 where fiber paths will overlap excessively (e.g., more than is desirable). For example, the analysis performed by the layup strategy analysis instructions 116 calculates values of the overlap metric at various locations and generates the GUI such that any portion(s) of the 3D model 152 where the fiber paths overlap more than the tow overlap threshold 122 are visually distinguished in the display 150 (e.g., indicated as visually distinct locations 156 on the object geometry 154). Alternatively, or additionally, the analysis performed by the layup strategy analysis instructions 116 calculates a number of tows that can be applied simultaneously (e.g., in a single course) while ensuring that the overlap metric at each location satisfies the tow overlap threshold 122. The GUI identifies in the display 150 the number of tows that can be applied at each location (e.g., the number of tows per pass 158) on the 3D model 152, based on the overlap metric and the tow overlap threshold 122.

In a particular implementation, the roller deformation threshold 124 indicates a constraint on roller deformability as it places a course on the surface. Failure of the compaction roller to conform to the surface may result in insufficient compaction pressure at a particular tow or portion of a tow and can result in delamination of a portion of the tow. A value of the roller deformation threshold 124 can be assigned to assist the user in identifying portions of the 3D model 152 that correspond to portions of the object 190 where insufficient compaction may occur (e.g., due to surface curvature or edges). For example, the analysis performed by the layup strategy analysis instructions 116 calculates values of the compaction roller deformation that are required for intimate contact between the contact roller and the application surface at various locations and generate the GUI such that any portion(s) of the 3D model 152 where the roller deformation that can be achieved is less than the roller deformation threshold 124 are visually distinguished in the display 150 (e.g., indicated as visually distinct locations 156 on the object geometry 154). Alternatively, or additionally, the analysis performed by the layup strategy analysis instructions 116 calculates a number of tows that can be applied simultaneously (e.g., in a single course) while ensuring that the roller deformation at each location satisfies the roller deformation threshold 124 and sufficient compaction pressure is achieved across all tows. The GUI identifies in the display 150 the number of tows that can be applied at each location (e.g., the number of tows per pass 158) on the 3D model 152, based on the roller deformation and the roller deformation threshold 124.

In a particular implementation, the tow nominal-angle deviation threshold 126 indicates a constraint on deviation of the fiber angles of a course from the nominal fiber angle of the course. For AFP processes, nominal fiber angles are generally defined for each layer based on rosette directions. The rosette directions are defined by the designer and are usually aligned with the dominant load direction for a particular object 190 being manufactured. The rosette directions define a zero degree (0°) direction, and one or more other directions are defined based on angular offset (referred to as "fiber angles") from the zero degree direction within the plane tangent to the surface. Each layer is associated with a fiber angle, and adjacent layers are generally associated with different fiber angles. For example, a first layer is a 0 degree layer, which indicates that the fibers of the first layer are generally oriented parallel to the rosette direction. In this example, a second layer that is adjacent to the first layer is in a 90 degree direction, which indicates that the fibers of the second layer are generally oriented perpendicular to the rosette direction. The fiber angle associated with each layer is also the nominal angle associated with the layer. Significant deviations from the nominal angle can affect mechanical properties of the as-build object 190.

Depending on the object geometry 154, the manufacturability constraints 178, the tow properties 184 and the number of tows in a course, it may not be possible for each tow to be aligned along its entire length with the nominal angle of the layer in which it resides. The tow nominal-angle deviation threshold 126 can be assigned to assist the user in identifying portions of the 3D model 152 that correspond to portions of the object 190 where the fibers deviate significantly from the nominal angle of the layer. For example, the analysis performed by the layup strategy analysis instructions 116 calculates values of fiber angles that can be applied at various locations and generate the GUI such that any portion(s) of the 3D model 152 where the fiber angles of any tow in the course fail to satisfy the tow nominal-angle deviation threshold 126 are visually distinguished in the display 150 (e.g., indicated as visually distinct locations 156 on the object geometry 154). Alternatively, or additionally, the analysis performed by the layup strategy analysis instructions 116 calculates a number of tows that can be applied simultaneously (e.g., in a single course) while ensuring that the fiber angles of each tow satisfy the tow nominal-angle deviation threshold 126. The GUI identifies in the display 150 the number of tows that can be applied at each location (e.g., the number of tows per pass 158) on the 3D model 152, based on the tow fiber angles and the tow nominal-angle deviation threshold 126.

In FIG. 1, the data 118 in the memory 114 also includes one or more parameters 138 that are used by the layup strategy analysis instructions 116. The parameters 138 in FIG. 1 include a steering radius parameter 130 and one or more roller deformation parameters 132, such as a stroke parameter 134, a normality angle parameter 136, or both. The parameters 138 include, correspond to, or are used to determine process data descriptive of an AFP process associated with one of the AFP machines 170 in a particular configuration 180. For example, the layup strategy analysis instructions 116 use the parameters 138 to determine whether one or more of the thresholds 128 will be satisfied during manufacture of the object 190 by a particular AFP machine 170 in a particular configuration 180 and using particular tows (e.g., tows of a particular material 186 and width 188).

In a particular implementation, a value or values of the steering radius parameter 130 are set based on capabilities of the steering mechanism 176, the manufacturability constraints 178, the tow properties, or a combination thereof. For example, the steering radius parameter 130 may indicate a minimum turning radius for a particular tow based on the material 186 of the tow and the width 188 of the tow. In this context, the minimum turning radius refers to the tightest turn (e.g., highest curvature) that the tow can endure without occurrence (or significant risk of the occurrence) of flaws, such as buckling or delamination of portions of the tow.

In a particular implementation, a value or values of the stroke parameter 134 and normality angle parameter 136 are set based on capabilities of the head 172, the rollers 174, the manufacturability constraints 178, or a combination thereof. For example, the number of tows that can be applied during the single pass is limited by the deformability that the set of rollers can achieve across a width of the set of rollers during the single pass. As another example, the number of tows that can be applied during the single pass is limited by the contact area of the particular roller and a corresponding tow and shear force applied to the tow by the particular roller if the roller surface is not tangent to the application surface.

Details regarding the stroke parameter 134 and the normality angle parameter 136 are described with reference to FIGS. 5A-5C.

In some implementations, the data 118 includes more, fewer, or different parameters 138 than the steering radius parameter 130, the stroke parameter 134, and the normality angle parameter 136. Additionally, or alternatively, in some implementations, the data 118 includes more, fewer, or different thresholds 128 than the tow count threshold 120, the tow overlap threshold 122, the roller deformation threshold 124, and the tow nominal-angle deviation threshold 126. To illustrate, additional parameters and thresholds associated with an AFP process are described with reference to FIG. 3. Further, in some implementations, one or more of the parameters 138 or thresholds 128 is dynamic (e.g., has a value that depends on process conditions). To illustrate, the value of the steering radius parameter 130 for a particular steering operation may depend on other turns in the same course or tow. To illustrate, turns in the same direction tend to build up tension in outer tows of the course and slacken the inner tows of the course. Some of the tension built up in the outer tows can be alleviated when a turn is made in the other direction. Thus, two adjacent turns in opposite directions (e.g., forming an S-curve) may have a different value of the steering radius parameter 130 than two adjacent turns in the same direction.

In operation, one or more users, such as stress engineers, use the design tool 102 to generate the model data 106. The model data 106 defines the object geometry 154 and may also include information about the object 190 as-designed, such as the rosette direction and nominal angles of plies and a number of plies for each nominal angle to satisfy mechanical requirements for the object 190.

One or more users of the layup strategy analysis tool 110 access the model data 106 and execute the layup strategy analysis instructions 116 to facilitate selection of a layup strategy to form the object 190 based on the model data 106. For example, the layup strategy can specify ply boundaries, course centerlines, tow-add/tow-drop locations, course layup direction, out-of-cycle operations (e.g., inspection or manual operations), etc. The layup strategy analysis instructions 116 generate the output 140 based on the model data 106, the thresholds 128 and the parameters 138 in the memory 114, and possibly other data. In a particular implementation, the output 140 indicates the number of tows per pass 158 for one or more plies of the object 190. In some implementations, the output 140 includes a heat map or another display technique that visually distinguishes some areas from others to highlight portions of the object geometry 154. For example, in some implementations, the output 140 includes a depiction of the 3D model 152 of the object 190 displayed in a manner that visually distinguishes locations at which a roller deformation threshold 124 is not satisfied for a particular count of tows that can be simultaneously applied during the single pass. As another example, in some implementations, the output 140 includes a depiction of the 3D model 152 of the object 190 displayed in a manner that visually distinguishes locations at which the steering radius parameter 130 is not satisfied for a particular count of tows that can be simultaneously applied during the single pass. As yet another example, in some implementations, the output 140 includes a depiction of the 3D model 152 of the object 190 displayed in a manner that visually distinguishes locations at which the tow count threshold 120 is not satisfied. In still another example, in some implementations, the output 140 includes a depiction of the 3D model 152 of the object 190 displayed in a manner that visually distinguishing counts of the number of tows that can be applied during the single pass at various locations.

The layup strategy analysis instructions 116 enable the user(s) to analyze multiple distinct sets of thresholds 128 and parameters 138 in order to select a particular layup strategy. The data descriptive of the selected layup strategy is provided to the NC programming tool 160, which uses the NC instructions 162 to generate machine instruction data 164. The machine instruction data 164 details the specific operations to be performed by one or more of the AFP machines 170 to manufacture the object 190.

The AFP machine(s) 170 operate according to the machine instruction data 164 to build up layers of fiber reinforced polymer to manufacture the object 190. In some implementations, the AFP machine(s) 170 may pause or be interrupted while manufacturing the object 190 so that inspections or manual processes can be performed. After the object 190 is manufactured, the object 190 undergoes post processing (e.g., curing, inspection, finishing, painting, etc.) in preparation for assembly 194 with other parts. As a result of using the layup strategy analysis tool 110 to develop and model multiple candidate layup strategies and/or to detect potential problem areas in advance, the end-to-end manufacturing time associated with the object 190 can be significantly reduced relative to conventional workflows in which 3D modelling and structural designs are passed to the NC programming tool 160 without such layup strategy analysis.

Figure 2:
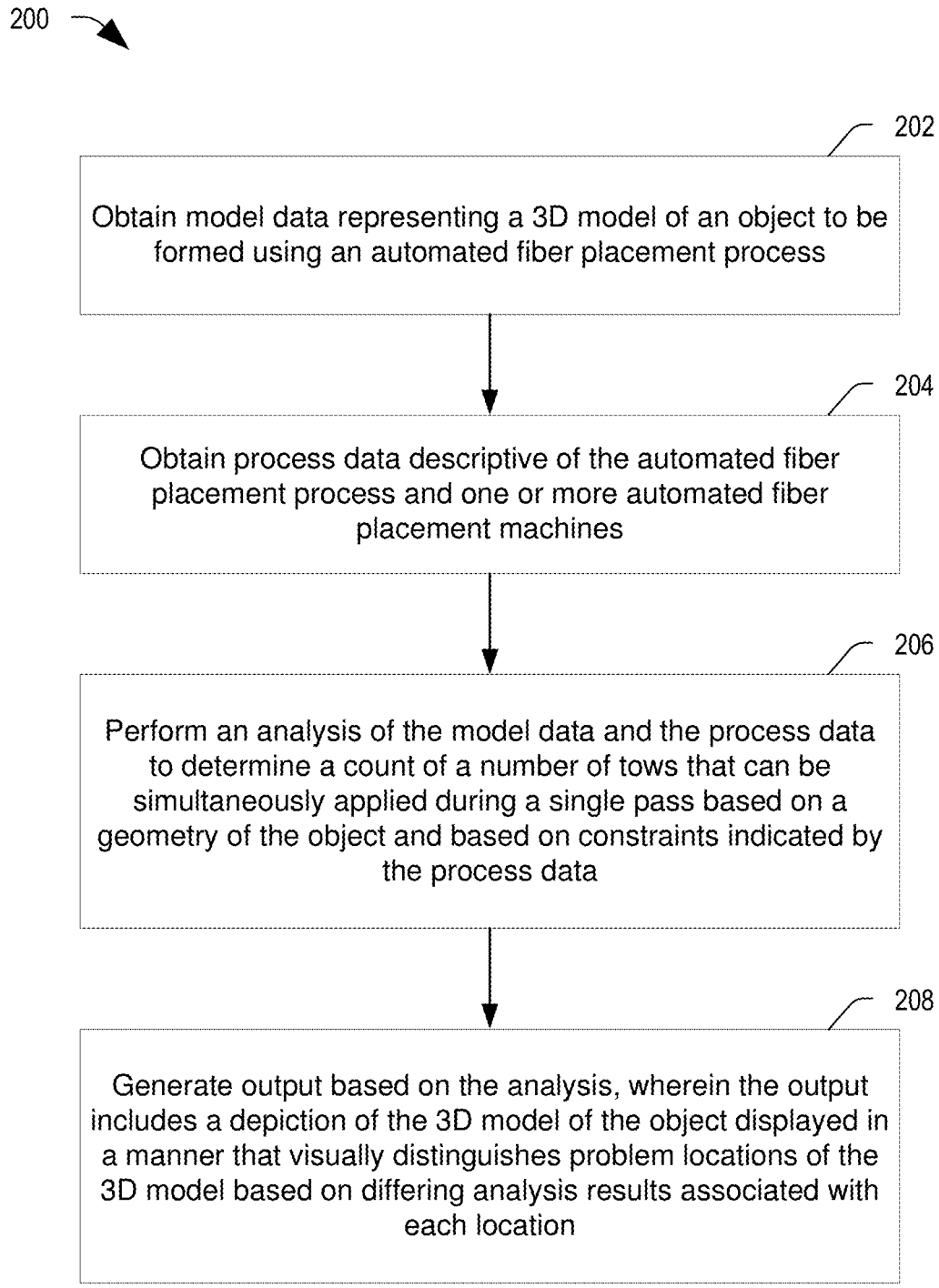
FIG. 2 is a flow chart of an example of a layup strategy analysis method according to a particular implementation.

FIG. 2 is a flow chart of an example of method 200 of layup strategy analysis according to a particular implementation. For example, the method 200 can be initiated, controlled, or performed by the processor 112 of the layup strategy analysis tool 110 executing the layup strategy analysis instructions 116.

The method 200 includes, at block 202, obtaining, at one or more processors of a computing device, model data representing a 3D model of an object to be formed using an automated fiber placement process. For example, the processor 112 of the layup strategy analysis tool 110 receive the model data 106 from the design tool 102. The model data 106 includes data corresponding to a 3D model of the object 190.

The method 200 includes, at block 204, obtaining, at the one or more processors, process data descriptive of the automated fiber placement process and one or more automated fiber placement machines. For example, the processor 112 of the layup strategy analysis tool 110 receives the thresholds 128 and the parameters 138 which are descriptive of the automated fiber placement process and the one or more AFP machines 170.

The method 200 includes, at block 206, performing, by the one or more processors, an analysis of the model data and the process data to determine a count of a number of tows that can be simultaneously applied during a single pass based on a geometry of the object and based on manufacturability constraints indicated by the process data. For example, the processor 112 of the layup strategy analysis tool 110 executes the layup strategy analysis instructions 116 to determine, based on the thresholds 128, the parameters 138, and the object geometry 154, the number of tows that can be simultaneously applied during a single pass.

The method 200 includes, at block 208, generating, by the one or more processors, output based on the analysis, where the output includes a depiction of the 3D model of the object displayed in a manner that visually distinguishes problem locations of the 3D model based on differing analysis results associated with each location. For example, the processor 112 of the layup strategy analysis tool 110 generates the output 140, which includes a depiction of the 3D model 152 with one or more visually distinct locations 156 to distinguish problem locations based on analysis results associated with each location.

The method 200 enables analysis of layup strategies early in a design process to detect potential problem areas in advance. Advance detection of potential problem areas can significantly reduce end-to-end manufacturing time of the object by enabling changes to the design of the object, changes to the AFP machine, changes to the AFP process, or both, that eliminate or reduce issues associated with the potential problem areas.

Figure 3:
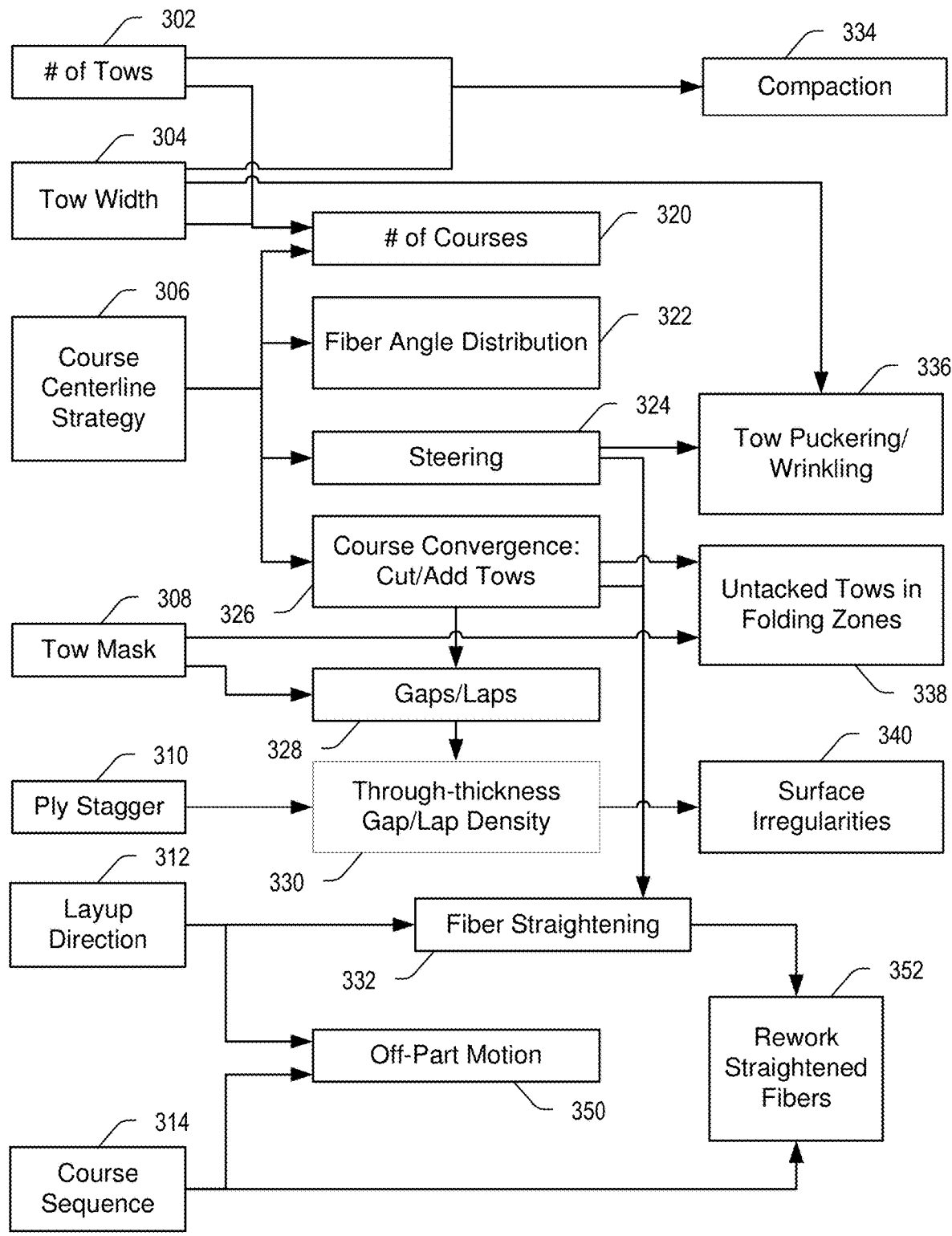
FIG. 3 is a diagram that illustrates an example of layup strategy considerations according to a particular implementation.

FIG. 3 is a diagram that illustrates an example of layup strategy considerations according to a particular implementation. In particular, FIG. 3 illustrates layup strategy control parameters and AFP process factors that are influenced by, or influence the selection of, the layup strategy control parameters. In FIG. 3, the layup strategy control parameters include a number of tows 302, a tow width 304, a course centerline strategy 306, a tow mask 308, ply stagger 310, layup direction 312, and course sequence 314. Further, in FIG. 3, the AFP process factors include number of courses 320, fiber angle distribution 322, steering 324, course convergence 326 (e.g., cutting and/or adding tows), gaps and/or laps ("gaps/laps") 328, through-thickness gap/lap density 330, fiber straightening 332, compaction 334, tow puckering and/or wrinkling ("tow puckering/wrinkling") 336, untacked tows in folding zones 338, and surface irregularities 340. The AFP process factors also include off-cycle work factors, such as off-part motion 350 and rework 352 of straightened fibers.

The AFP process factors of FIG. 3 include factors related to the quality or properties of a laminate material formed by the AFP process and factors related to the manufacturing time of the laminate material. For example, generally, the number of courses 320, steering 324, course convergence 326, and off-part motion 350 are factors that affect the total manufacturing time of a laminate. As another example, the fiber angle distribution 322, the through-thickness gap/lap density 330, and fiber straightening 332 are factors that tend to influence the quality or properties of the laminate. Further, gaps/laps 328, compaction 334, tow puckering/wrinkling 336, untacked tows in folding zones 338, and rework 352 of straightened fibers are factors that can influence either or both of the manufacturing time and the quality or properties of the laminate. The layup strategy control parameters and AFP process factors illustrated in FIG. 3 are discussed below and, in some cases, with reference to other figures.

In a particular implementation, the number of tows 302 and the tow width 304 together determine the course width, and the course width determines the number of courses 320 needed per layer of the object 190. Using a larger course width reduces time to apply a particular amount of material (e.g., fiber reinforced polymer material) at a given lay down speed of the AFP machine 170. Thus, reducing the number of courses 320 per ply tends to reduce the in-cycle time to manufacture the object 190. The tow width 304 also may also affect out-of-cycle manufacturing time. For example, using larger tows means that fewer tows are needed to cover the working surface to form a single layer (or ply). Assuming that the probability of the AFP machine 170 stopping due to failed tows is the same for wide tows as for narrow tows, the total number of AFP machine 170 stops due to failed tows is smaller if a smaller number of wider tows are used rather than a larger number of narrower tows.

In some instances, the course width may be reduced (e.g., by using narrower tows or fewer tows) based on the surface geometry of the object 190 and roller deformation parameters 132 of the roller. For example, for a particular course that covers or forms a relatively narrow edge of the object 190, the roller(s) 174 may not be able to deform or displace sufficiently to simultaneously compact tows on the edge and on each side of the edge. Thus, the number of tows applied for the particular course may be limited by the geometry of the working surface of the object 190.

As a tow is applied to the working surface, a roller 174 applies a compaction force to the tow to cause the tow to adhere (or cohere) to the working surface. The compaction force applied should be adequate to keep portions of the tow from delaminating from the working surface, which can lead to puckers, wrinkles, folds, slippage, bridging, etc.

A roller 174 may not apply sufficient compaction pressure to a tow for several reasons, two of which are characterized by stroke and normality, each of which is illustrated in FIG. 5A. For example, FIG. 5A illustrates a segmented roller 500 that includes a plurality of individual rollers 174. The individual rollers 174 of the segmented roller 500 share a common axis 502. The individual rollers 174 are able to move individually in a direction along a normal 508 of the roller 174 that is required to follow contours of a surface 506) by a distance 504 that defines the stroke of each individual roller 174. The normal 508 of the roller 174 is determined based on a plane 516 that is tangent to the segmented roller 500 at a centerline 518 of the segmented roller 500. The normal 508 of the roller 174 may be angularly offset from a normal 510 of a plane 512 that is tangent to the surface 506 at the centerline 518 of the segmented roller 500 by an offset angle 514 (also referred to as the head tilt angle).

Thus, for the segmented roller 500 of FIG. 5A, the stroke is limited by how much the individual rollers can move or deform with respect to the common axis 502 and by how much each individual roller segment can deform. If a solid roller, rather than the segmented roller 500, is used, the stroke is limited by how much the solid roller can deform (e.g., compress or bend around its axis).

In some instances, such as when the surface 506 has a concave contour, outer individual rollers 174 of the segmented roller 500 may be able to apply sufficient compaction force (e.g., force toward the surface 506); however, inner individual rollers 174 of the segmented roller 500 may not be able to reach the surface 506 or may not be able to apply sufficient compaction pressure. For example, referring to FIG. 5C, a cross-section of a contoured surface 520 and plurality of tows 522 are illustrated without a roller or set of rollers that apply the tows 522. A distance 526 between the upper most tow (e.g., tow 522A) being applied and the lower most tow (e.g., tow 522F) being applied is illustrated in FIG. 5C. In order for the rollers to apply sufficient compaction pressure to tow 522F, the stroke allowed by the AFP head must be equal to or greater than the distance 526. If the stroke of the roller associated with tow 522F is less than the distance 526, bridging of tows can occur. FIG. 6D illustrates an example of bridged tows 602. Thus, if the stroke of the roller associated with tow 522F is less than the distance 526, the set of tows 522 cannot be applied in a single pass. This issue can be resolved by using a narrower head, using a smaller set of rollers, using rollers with a larger stroke distance 504, changing the layup strategy, or changing the contour of the surface 520.

A similar issue can arise if a surface is convex, except that, when the surface is convex, the course width (rather than the head or roller width) can be changed to resolve the issue. For example, for a convex surface, the upper most tows are interior tows, which can be applied with sufficient compaction force, however the outermost tows are lower that the interior tows and may not be applied with sufficient compaction pressure. Thus, the outermost tows can be dropped or omitted from the course to change the course width and allow for application of sufficient compaction pressure by the roller to the tows.

Normality is a metric related to a contact angle between the individual roller and the working surface. FIG. 5B illustrates a portion of a single roller 174, such as an individual roller of a segmented roller 500. The roller 174 is in contact with the surface 506. FIG. 5B also illustrates a plane 516A that is tangent to the roller 174 at a centerline 518A of the roller 174, and a plane 512A that is tangent to the surface 506 at the centerline 518A of the roller 174. The centerline 518A is offset along axis 502 from the centerline 518 of the segmented roller 500 of FIG. 5A. A normal 508A of the plane 516A is angularly offset from a normal 510A of the plane 512A by an angle 514A, which causes a compaction force applied along the normal 508A to have a component of force (e.g., a slip component) that is in a direction that is not perpendicular to the plane 512A.

For example, FIG. 5C includes an inset box showing details of a tow 522K being applied to the surface 520. The roller 174 applies compaction force along a direction 540 (which is oriented along the normal 508A of the roller 174). However, a surface of the roller 174 (initially approximately coincident with the tow 522K in FIG. 5C) is angularly offset from the surface 520 by the angle 514A. As a result, the surface of the roller 174 deforms to a different shape, represented as shape 546. In the shape 546, a portion of the roller 174 in a compaction area 548 may be able to apply sufficient compaction pressure, and the remainder of the roller 174 is not able to apply sufficient compaction pressure. The shape 546 and the resulting compaction area 548 are due to the magnitude of the angle 514A, the magnitude of the compaction force along the direction 540, and the deformation characteristics of the roller 174 (e.g., the normality angle parameter 136). The resultant compaction force has a compaction component 542 (e.g., a component of force that tends to press the tow 522K into contact with the surface 520) and a slip component 544 (e.g., a component of force that tends to cause the tow 522K to slide across the surface 520, also referred to herein as a shear force).

In the situation illustrated in FIG. 5C, the roller 174 accommodates some angular offset by deforming to the shape 546, but if the shape 546 does not fully contact the surface 520 portions of the tow 522K (e.g., one edge) may not be compacted sufficiently, which can lead to lifted tows. An example of lifted tows 604 is illustrated in FIG. 6B. The situation illustrated in FIG. 5C may also, or in the alternative, lead to slippage of tows (e.g., tows that move from their intended layup position) due to the slip component 544.

Figure 10:
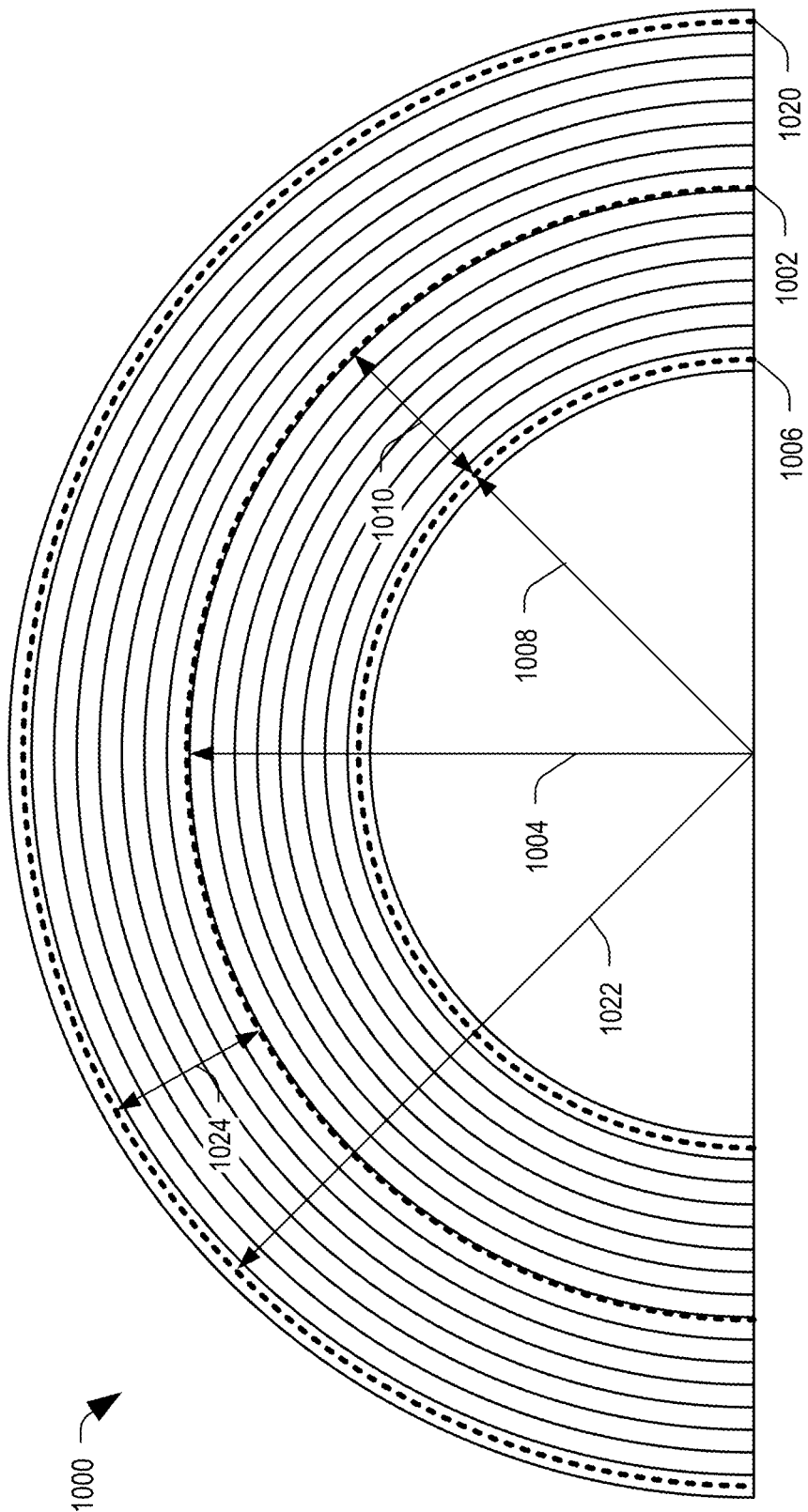
FIG. 10 is a diagram that illustrates an example of layup strategy analysis aspects related to tow curvature of a course.

Tow width 304 and course width influence the amount of steering 324 that is possible without causing defects. For example, FIG. 10 illustrates an example of a steered course 1000. The steered course 1000 follows a course centerline 1002 that has a centerline steering radius 1004. An inner tow 1006 of the steered course 1000 follows a tow steering radius 1008 that is smaller than the centerline steering radius 1004 by an amount corresponding to a distance 1010 between a centerline of the tow 1006 and the course centerline 1002. An outer tow 1020 of the steered course 1000 follows a tow steering radius 1022 that is larger than the centerline steering radius 1004 by an amount corresponding to a distance 1024 between a centerline of the tow 1020 and the course centerline 1002. As shown in FIG. 10, the steering radius of individual tows increases with distance from the course centerline 1002 on one side of the course 1000 and decreases with distance from the course centerline 1002 on the other side of the course 1000. Thus, wider courses result in tighter steering (shorter turning radii) on the inner tow 1006 of a steered course 1000.

Tow width 304 has a similar effect on steering as a course width. For example, during a turn, the inner edge of a tow travels less than, and is subjected to higher compression than, the outer edge of the tow. The differences in distance traveled by the outer and inner edges of a tow, or the outer and inner tows of a course can cause defects. For example, as illustrated in FIG. 11B, inner edges of a tow can pucker, or as illustrated in FIG. 11C, one or more tows of a course can buckle.

In a particular implementation, the course centerline strategy 306 is selected in part based on fiber angle distribution 322 requirements, which are based on desired structural properties of the object 190. For example, a manufacturing organization may be subject to engineering standards that specify an allowable fiber angle deviation, such as a fiber angle deviation of +3 degrees from the nominal fiber angle. On general curved surfaces, satisfying the fiber angle distribution 322 requirements leads to steering 324 fiber paths, as well as course convergence 326.

Figure 7A:
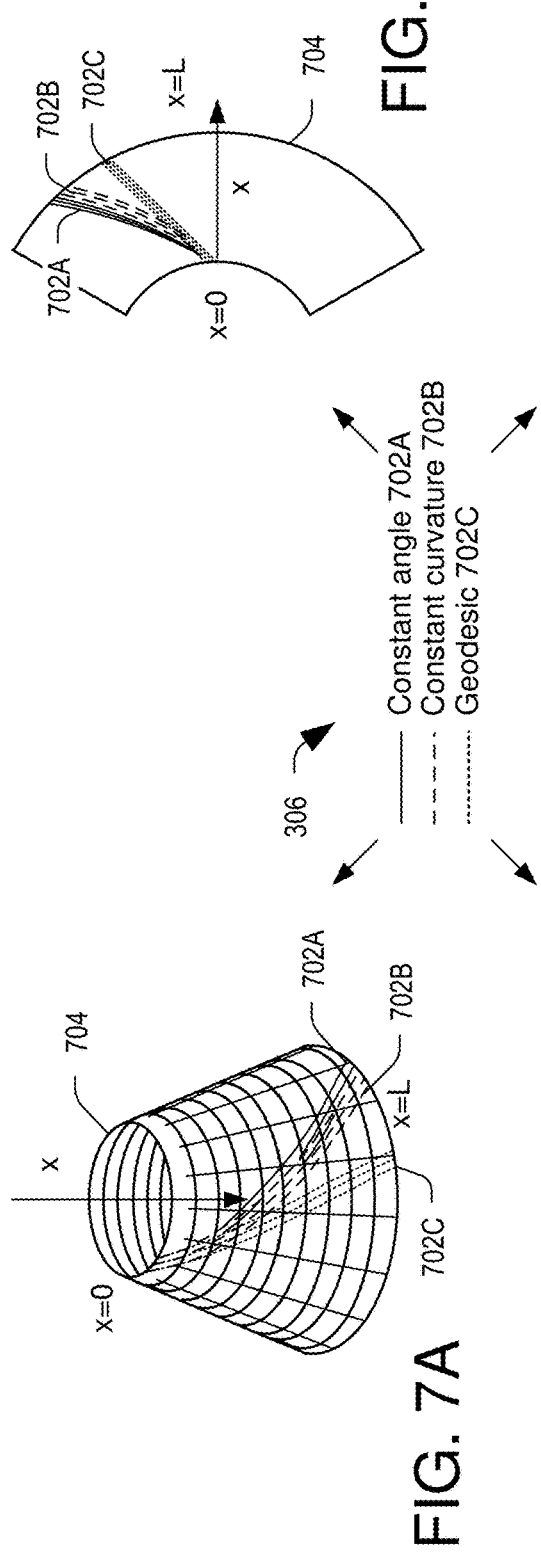
FIGS. 7A and 7B are diagrams that illustrate an example of layup strategy analysis aspects related to steering and in-plane curvature.
Figure 7B:
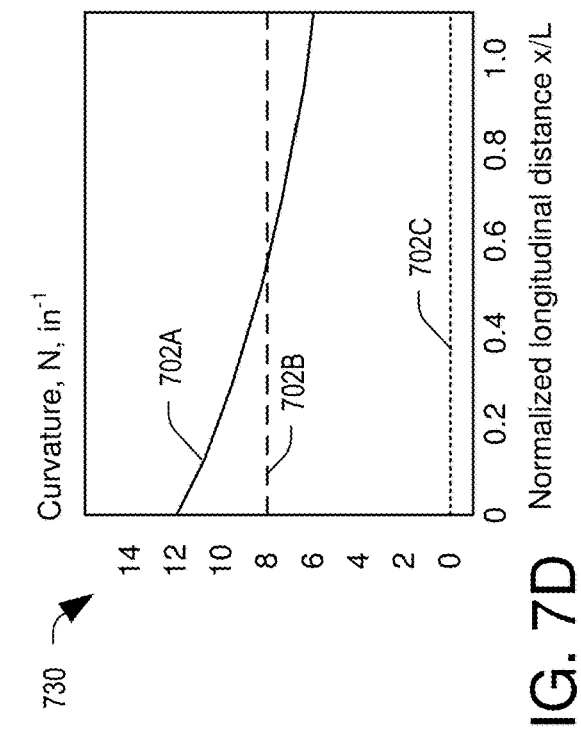
Figure 7D:
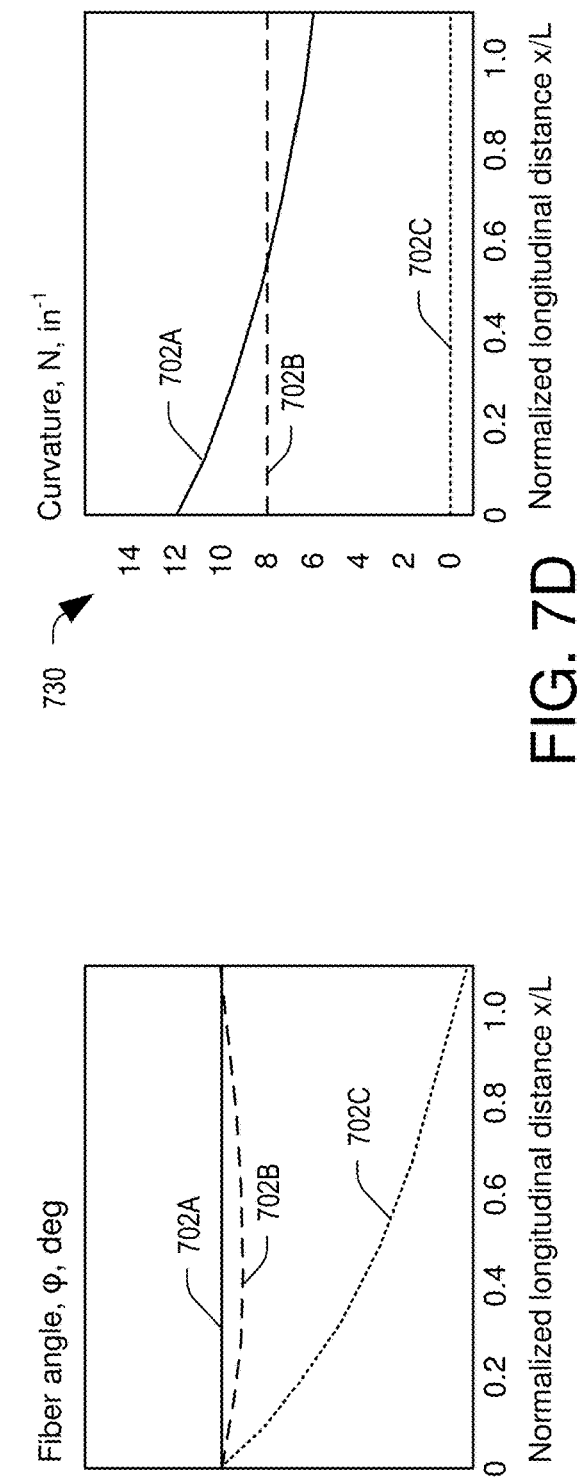
FIG. 7D is a graph that illustrates tow curvature as a function of longitudinal distance for steering strategies illustrated in FIGS. 7A and 7B.
Figure 7C:
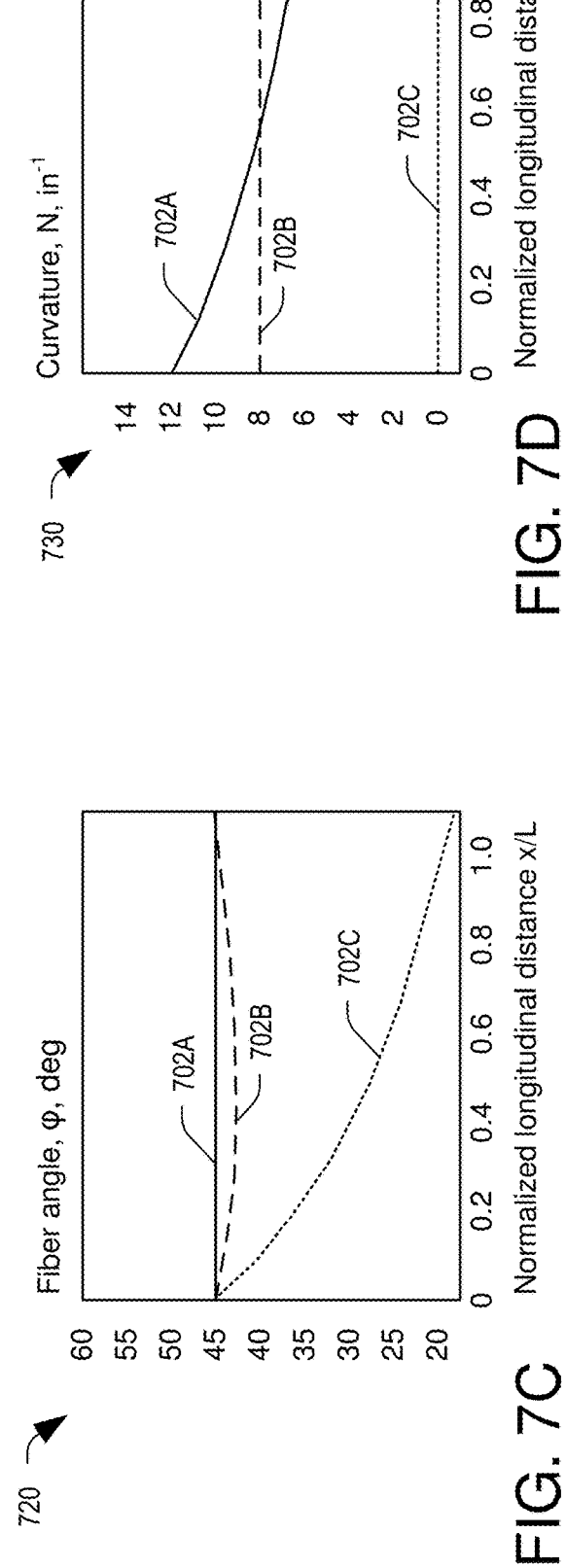
FIG. 7C is a graph that illustrates fiber angle as a function of longitudinal distance for steering strategies illustrated in FIGS. 7A and 7B.

Several course centerline strategies 306 are illustrated in FIGS. 7A and 7B. Effects of the course centerline strategies 306 of FIGS. 7A and 7B are illustrated in FIGS. 7C and 7D. In particular, FIG. 7C is a diagram 720 that graphs a normalized longitudinal distance (from x=0 to X=L in FIG. 7A) of each fiber path versus fiber angle along each fiber path 702. FIG. 7D is a diagram 730 that graphs the normalized longitudinal distance of each fiber path versus curvature.

In FIG. 7A, fiber paths 702 are shown on a 3D representation of a conical shell 704, and in FIG. 7B, the conical shell 704 is shown flattened in a 2D representation. The conical shell 704 represents a curved working surface to which one or more course are to be applied.

Each of the fiber paths 702 represents a course and includes a centerline and course edges. A first fiber path 702A represents a course following a constant fiber angle of 45 degrees. Thus, as shown in FIG. 7C, the first fiber path 702A has a constant fiber angle of 45 degrees along the entire distance from x=0 to x=L and is referred to as a constant angle course centerline strategy. The constant angle course centerline strategy of the first fiber path 702A perfectly follows the nominal fiber angle for a 45 degree ply. Although the fiber angle distribution of the first fiber path 702A is ideal for a nominal 45 degree ply, as FIG. 7D shows, steering (i.e., a non-zero curvature) is required to implement the constant angle course centerline strategy of the first fiber path 702B. The amount of steering required varies over the normalized longitudinal distance, with a smaller radius of curvature needed near the small radius of the cone (e.g., near x=0 or x/L=0) than at the large radius of the cone (x=L or x/L=1) to maintain the 45 degree fiber angle orientation.

The third fiber path 702C corresponds to a geodesic (or "natural") course centerline strategy. The fiber path of a geodesic course centerline strategy is fully defined by its starting point and initial direction for a given surface geometry. In the examples illustrated in FIGS. 7A and 7B, the starting point and initial direction of the third fiber path 702C are the same as the starting point and initial direction of the other two fiber paths 702A and 702B (e.g., at the small radius of the conical shell 704, where the fiber angle is 45 degrees). As illustrated in FIG. 7C, the fiber angle distribution for the third fiber path 702C associated with the geodesic course centerline strategy starts at 45 degrees at x/L=0, but then rapidly decreases, ending at about 20 degrees at the large radius (x/L=1). No steering is applied to achieve the geodesic course centerline strategy; thus, the third fiber path 702C is associated with zero curvature in FIG. 7D.

The second path 702B corresponds to a constant curvature course centerline strategy. As shown in FIG. 7D, the constant curvature course centerline strategy of the second fiber path 702B entails steering with a constant radius of curvature. The constant curvature course centerline strategy results in some deviation from the nominal fiber angle, as illustrated in FIG. 7C, but less deviation than the geodesic course centerline strategy. Thus, the constant curvature course centerline strategy may be appropriate to reduce the deviation from the nominal fiber angle while limiting steering.

Figure 8:
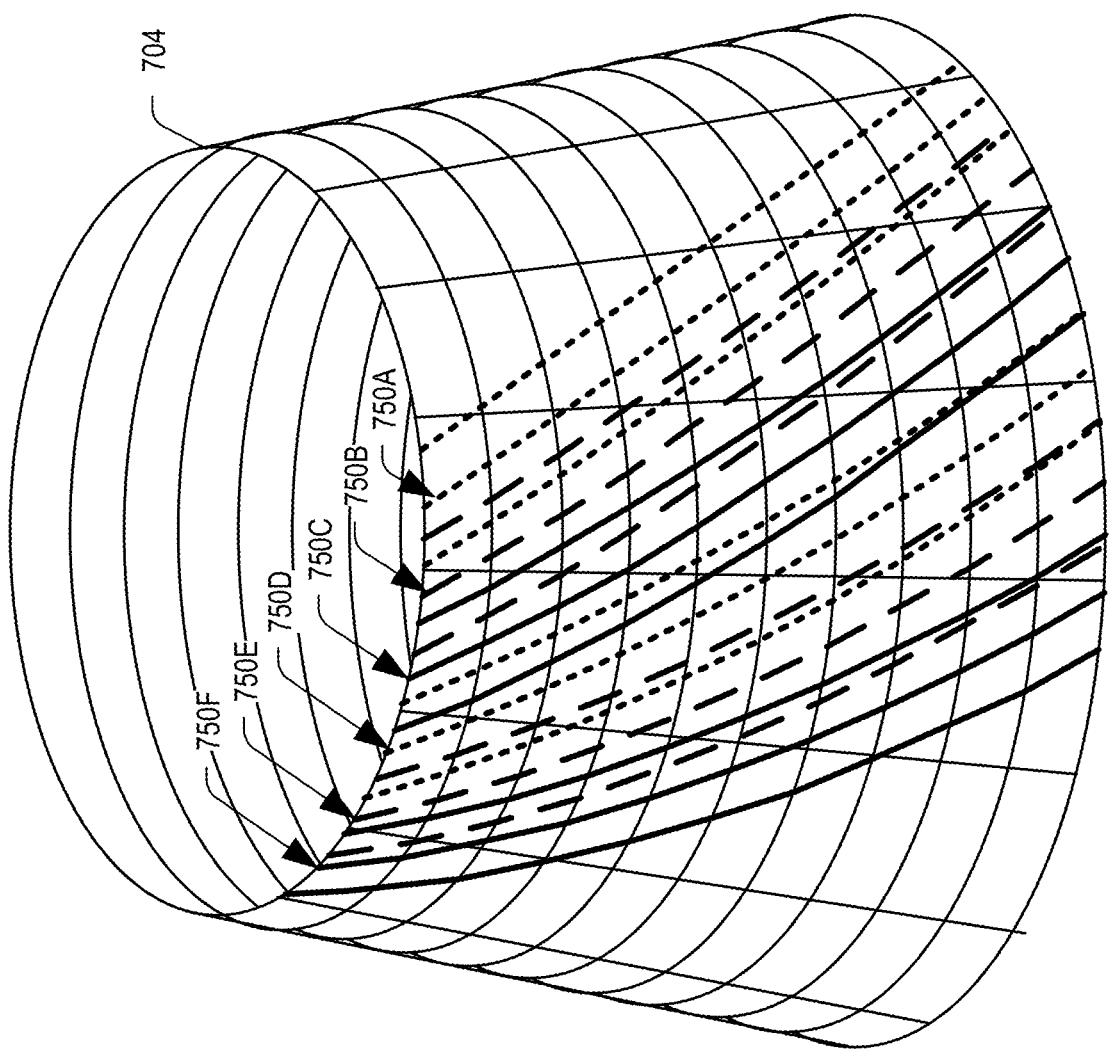
FIG. 8 is a diagram that illustrates an example of layup strategy analysis aspects related to course convergence.

Course convergence 326 is illustrated in FIG. 8 where six courses 750 are represented on the conical shell 704. Each of the courses is represented by a centerline and course edges. As illustrated in FIG. 8, the centerlines converge near the small end of the cone, causing overlaps between edges if the course width is kept constant. Overlaps can be reduced or eliminated by selectively changing the course width near the areas of overlap. For example, if courses are applied from the large end of the conical shell 704 (e.g., the bottom in FIG. 8) toward the small end of the conical shell 704 (e.g., the top in FIG. 8), tows can be cut near the regions of overlap, which reduces the number of tows 302 in particular portions of a course and thereby changes the course width of the course. Alternatively, if courses are applied from the small end of the conical shell 704 (e.g., the top in FIG. 8) toward the large end of the conical shell 704 (e.g., the bottom in FIG. 8), each course can start with a reduced number of tows 302 and tows can be added near the regions of decreasing overlap, which increases the number of tows 302 in particular portions of a course and thereby changes the course width of the course. Thus, depending on the direction in which the courses are applied, avoiding or limiting course convergence 326 in the example of FIG. 8 entails cutting or adding tows on-the-fly.

The number of courses 320 can also depend on the nominal fiber angle of the ply. As an example, a long thin part can be formed using a first ply with a nominal fiber angle oriented along a length of the part (e.g., a 0 degree ply) and a second ply with a nominal fiber angle oriented along the width of the part (e.g., a 90 degree ply). Since the length of the part is greater than the width of the part, the 0 degree ply will require fewer courses than the 90 degree ply. Additionally, the courses (and tows) of the 0 degree ply will be longer than the courses (and tows) of the 90 degree ply.

Longer courses are more efficient to apply because the average layup speed is larger. For example, AFP machines 170 generally have a "roll-in" distance, over which no material is deposited and the head 172 starts accelerating. Subsequently, tows are added and material is deposited, and the AFP machine 170 can keep accelerating until a maximum speed is reached. As the head 172 approaches the end of the course, the AFP machine 170 decelerates and tows are cut. After a "roll-out" distance, the head 172 is lifted from the working surface. Often, the maximum speed is not reached for short courses, and thus these short courses are less efficient.

As explained above with reference to FIGS. 7A-7D, steering 324 can be used to help satisfy fiber angle distribution 322. Steering 324 can also be used to reduce course convergence 326 thereby limiting cutting and/or adding of tows in the middle of a ply. However, steering 324 can introduce defects if the steering radius is too small. Another way this is sometimes described is in terms of curvature. As used herein, curvature refers to in-plane path curvature, which is the inverse of the steering radius. Thus, steering 324 may introduce defects if the curvature is too large.

The steering radius at which defects occur depends on the tow width 304, the material properties of the tows and the AFP process parameters. Steering 324 involves in-plane bending of a tow, which causes tensile and compressive stresses at the edges of the tow that vary proportional with the distance to the tow centerline. When courses are steered, defects such as tow puckering and/or wrinkling 336 can occur.

Tow puckers are out-of-plane projections of the tow caused by in-plane bending. As previously noted, examples of tows with puckers are shown in FIG. 11B. Puckering can be suppressed by increasing cohesion of the tows to the working surface. However, a disadvantage associated with increasing cohesion is that, if rework is needed, it can be extremely difficult to pry the erroneous tows loose without damaging underlying plies. The size and number of puckers that form can be reduced by applying more tension on the tow. However, other defects can be introduced if there is too much tension on the tow. For example, the tow may bridge on concave surfaces (as illustrated in FIG. 6D). Increased tension on the tows also increases the probability of untacked tows or tow folding.

Steering 324 and cutting tows together influence fiber straightening 332. Fiber straightening 332 refers to a circumstance that can occur when a tow is cut while the course is being steered. The cut tow will tend to follow a geodesic path (e.g., no curvature) after it is cut, while the remaining tows of the course continue to be steered. Tows on the inside of the turn tend to be constrained by adjacent tows and are more likely to follow the steered path. However, tows on the outside of the course tend to straighten. As a result, the cut tow may not align with the course as expected (e.g., a portion of the cut tow is straightened). Layup strategy analysis may flag areas on the part surface that exhibit both high steering and convergence.

Cutting tows on the inside of a turn rather than on the outside of a turn can reduce fiber straightening 332. Avoiding cutting tows while steering with large curvatures can also reduce fiber straightening 332. One way to avoid cutting tows on a turn is to reverse the layup direction 312 so that tows are added instead of cut during steering 324.

Generally, straightened tows need to be reworked 352. For example, the straightened tow may be lifted off of the working surface and realigned with other tows of the course. This is often a manual process that tends to be very labor intensive and adds time to the end-to-end manufacturing process. Rework 352 of straightened fibers is also impacted by course sequence 314. For example, courses with a smaller radius should be laid down after courses with a larger radius if fiber straightening 332 cannot be avoided. If courses with a smaller radius are laid down before courses with a larger radius and fiber straightening 332 occurs, the inner tows of the later applied course (e.g., the larger radius course) will be laid on top of the straightened outer tow of the earlier applied course (e.g., the smaller radius course), making it difficult or impossible to lift and adjust the straightened tows. Other defects can also arise when tows are added or cut while steering.

Constraints regarding acceptable amounts of steering 324 for particular tow material and tow widths are determined based on steering trials. Based on such trials, a minimum value may be set for the steering radius parameter 130. As long as a layup strategy uses steering 324 with steering radii greater than the steering radius parameter 130, layup defects due to steering should be limited. In some implementations, the layup strategy may also specify adapting AFP process parameters, such as speed and heat, to increase the tack.

In some implementations, a layup strategy may seek to avoid steering 324 altogether when possible since, when no steering 324 is used, wider tows and/or wider courses can be used, which increases the layup speed. However, as described with reference to FIGS. 7A-7D, for certain surface geometries, fiber angles can deviate considerably from nominal fiber angles if no steering is used. Additionally, geodesic paths on some surfaces converge/diverge, requiring tow cuts and adds.

Course convergence 326 cause overlaps (e.g., laps 328) to occur if the course width is kept constant. AFP machines 170 generally allows individual tows to be added or cut independently of one another, which enables varying the course width to avoid large overlaps. When a tow is cut, the cut is perpendicular to the fiber direction, as shown in FIG. 12A. FIG. 12A illustrates a region 1200 of a layup surface in which two courses are converging. The courses include a first course 1202, the tows of which are illustrated in dotted lines, and a second course 1204, the tows of which are illustrated in dashed lines. As the courses 1202, 1204 converge in the region 1200, an upper tow 1208 of the second course 1204 is cut (at cut end 1210), which limits the amount of overlap between the upper tow 1208 of the second course 1204 and a lower tow 1206 of the first course 1202. However, cutting the upper tow 1208 leaves an area 1212 in which no tow of either course 1202, 1204 is present. This area 1212 is referred to as a gap. FIG. 12A also shows that the lower tow 1206 of the first course 1202 is cut (at cut end 1214) later in the AFP process, but not before the lower tow 1206 of the first course 1202 partially overlaps the upper tow of the second course 1204, resulting in an area 1216 referred to as a lap or overlap. Another gap area 1212 is also form after the cut end 1214 of the lower tow 1206 of the first course 1202.

Non-smooth course boundaries formed by gaps (e.g., by the area 1212) and laps (e.g., the area 1216) between adjacent courses caused by adding or cutting tows reduces the stiffness and strength of the resulting laminate. Stress engineers apply safety factors (often referred to as "knockdowns") to account for the stiffness and strength reductions due to gaps and laps, and extra plies may be added to the laminate to offset the knockdowns. These extra plies increase manufacturing time and the final weight of the object 190. Additionally, some AFP machines 170 slow down to add or cut tows, which increases manufacturing time. Further, large gaps may require inspection or rework. Thus, a layup strategy that avoids course convergence to the extent possible (e.g., by using parallel courses) may enable faster manufacturing times, stronger parts, lighter parts, or a combination thereof. However, laying parallel courses on surfaces can increase fiber angle deviations and require more steering.

The tow mask 308 identifies which tows are being laid down within each course and will change along a course as tows are cut and added. The tow mask 308 is affected by the course centerline strategy 306 since the course centerline strategy 306 affects course convergence 326. However, multiple different tow masks 308 may be compatible with a particular course centerline strategy 306. For example, as described with reference to FIG. 12A, tows can be cut or added on both of two adjacent courses, or tows can be cut or added on only one of the adjacent courses. Also, the selection of a particular tow mask 308 can affect the occurrence of defects, such as fiber straightening 332.

Ply stagger 310 refers to offsetting plies that have identical nominal fiber angles. For example, two 0 degree plies should be offset so that tow edges of the plies do not align with one another. Ply stagger 310 is usually accomplished by offsetting the starting point for course generation from one ply to the next. However, surface geometry and thickness buildup of consecutive plies can cause a natural shift in the course pattern, such that course boundaries of plies with the same nominal fiber angle do not meet the stagger requirements at some locations.

The layup direction 312 refers to the direction in which a course is laid down. As describe above, reversing the layup direction 312 can change whether tows are added or cut to limit course convergence 326. Reversing the layup direction 312 can also help prevent fiber straightening 332 by changing tow cuts into tow adds. In some circumstances, layup speed can be different for one layup direction 312 than for the reverse layup direction 312. For example, some AFP machines 170 operate at a different speed to add tows than to cut tows. Thus, changing from adding to cutting tows (or vice versa) can reduce manufacturing time. Additionally, the amount of off-part motion 350 needed can be different for one layup direction 312 than for another layup direction 312. It is possible that the AFP machine 170 may operate faster in first layup direction 312 than in a second layup direction, but the first layup direction 312 may require more off-part motion 350 than the second layup direction 312. In such instances, the layup strategy analysis may include simulations of layup speed and off-part motion to determine which layup direction 312 is more efficient overall.

The course sequence 314 refers to the order in which courses of a ply are laid down. The course sequence 314, together with the layup direction 312 for each course, determines the off-part motion 350, thus influencing the in-cycle time. Additionally, the course sequence 314 can affect rework 352. For example, if courses are steered and fiber straightening 332 cannot be avoided by changing tow masks 308 and/or layup directions 312, the course sequence 314 may be adjusted to avoid applying a new course on top of a straightened tow, so that the straightened tow can be reworked when the full ply is done rather than between courses.

Figure 4:
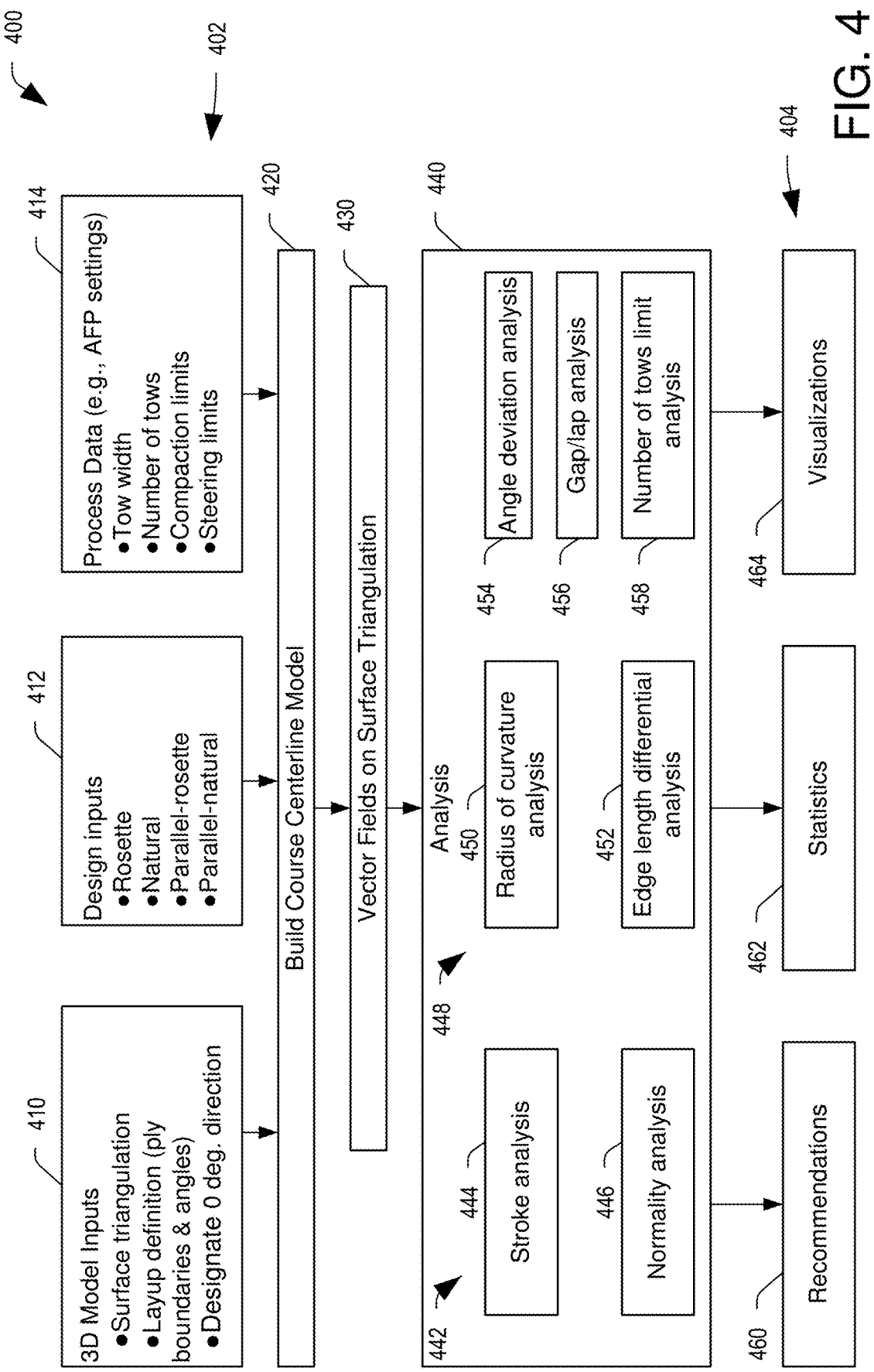
FIG. 4 is a diagram that illustrates an example of layup strategy analysis inputs and outputs according to a particular implementation.

FIG. 4 is a diagram that illustrates an example of inputs 402 and outputs 404 of a layup strategy analysis 400 according to a particular implementation. The layup strategy analysis 400 is performed by the processor(s) 112 of FIG. 1 while executing the layup strategy analysis instructions 116. In a particular implementation, the outputs 404 include, correspond to, or are included within the output 140 of FIG. 1. In some implementations, the inputs 402 include, correspond to, or are included within the data 118, the model data 106, the manufacturability constraints 178, the tow properties 184, or a combination thereof.

In FIG. 4, the inputs 402 include 3D model inputs 410, design inputs 412, and process data 414. In other implementations, the inputs 402 include more, less, or different data. For example, any one or more of the controllable factors discussed with reference to FIG. 3 can be provided as input to the layup strategy analysis 400. The 3D model inputs 410 include, for example, a surface description, such as a surface triangulation in which surfaces of the 3D model 152 are tessellated to define a set of triangles or other surface approximation elements (also referred to herein as "elements"). The 3D model inputs 410 in FIG. 4 may also include, for example, layup definitions, such as data indicating ply boundaries and ply nominal angles (also referred to herein as rosette directions) and a designation of a 0 degree direction.

The design inputs 412 include, for example a designation of one or more course centerline strategies 306 to be analyzed. In FIG. 4, the course centerline strategies 306 include a rosette centerline strategy (which generates the constant angle fiber path 702A described with reference to FIGS. 7A-7D) and a natural centerline strategy (which generates the geodesic fiber path 702C described with reference to FIGS. 7A-7D). The parallel-rosette centerline strategy starts off with a first fiber path that exactly goes through a specified initial element in the specified direction (e.g., with no fiber angle deviation) and then follows the constant angle fiber path. Other fiber paths of the ply are arranged parallel to the first fiber path. Fibers of the other plies can deviate from the nominal fiber orientation. The parallel-rosette centerline strategy may use significant steering but eliminates overlaps between adjacent courses. The parallel-natural centerline strategy starts off with a first fiber path that exactly goes through a specified initial element in the specified direction (e.g., with no fiber angle deviation) and then follows a natural (geodesic) path. Other fiber paths of the ply are arranged parallel to the first fiber path. The parallel-natural centerline strategy eliminates overlaps between adjacent courses and reduces steering as compared to the parallel-rosette centerline strategy. However, the parallel-natural centerline strategy generally results in larger fiber angle deviations than does the parallel-rosette centerline strategy. In other examples, additional or different centerline strategies may be considered, such as a constant curvature centerline strategy (which generates the constant curvature fiber path 702B described with reference to FIGS. 7A-7D).

In FIG. 4, the process data 414 includes tow width 304, number of tows 302, compaction limits (e.g., roller deformation parameters 132), and steering limits (e.g., steering radius parameters 130). In other implementations, the process data 414 includes more, fewer, or different parameters, such as parameters descriptive of tow materials 186.

The layup strategy analysis tool 110, at block 420, uses the inputs 402 to build a course centerline model for each element. As an example, the layup strategy analysis tool 110 uses the design inputs 412 to determine a starting location (if required for a course centerline strategy) and one or more course centerline strategies 306 to be modeled. In a particular implementation, the layup strategy analysis tool 110 determines a course centerline through each element in the triangulated surface model to facilitate selection of actual centerlines and/or starting locations used during NC programming. To illustrate, the set of course centerlines determined by the layup strategy analysis tool 110 reveals best case centerlines, worst case centerlines, or intermediate case centerlines to assist with centerline planning. During NC programming, a subset of the analyzed centerlines are used. Manufacturability checks performed without the layup strategy analysis tool 110 require full NC programming and running an end-to-end manufacturing simulation to account for multiple layers and ply stagger (which will cause the starting location to shift from ply to ply). Such end-to-end manufacturing simulation is time consuming and resource intensive and comes relatively late in the design process (e.g., after NC programming). The layup strategy results generated by the layup strategy analysis tool 110 disclosed herein facilitate selection of start points before NC programming is performed and uses a simpler, and less resource intensive model than an end-to-end manufacturing simulation based on the NC programming. As a result, changes can be made earlier in the process, resulting in significant time and resource savings. Other factors described with reference to FIG. 3 may also be considered and modeled. To illustrate, the layup strategy analysis tool 110 models the course centerline of each course of each ply; in which case, ply stagger 310 can be accounted for while modeling the course centerlines.

At block 430, the layup strategy analysis tool 110 determines vector fields on the surface(s) of the 3D model using a particular centerline strategy (e.g., one of the centerline strategies described above). For example, when a rosette centerline strategy is used, the vector field is determined by projecting the rosette direction onto tangent planes (e.g., triangles of the triangulated surface) defined by the surface(s). Each surface modeled represents a ply including one or more courses. The vector fields indicate the fiber angle direction in each triangle of the surface modeled.

At block 440, the layup strategy analysis tool 110 performs one or more analyses based on the vector fields. The particular analysis or analyses performed may be based on user input or settings. In FIG. 4, the analyses include one or more compaction analyses 442, one or more steering analyses 448, an angle deviation analysis 454, a gap/lap analysis 456, and a number of tows limit analysis 458. In other implementations, the analyses include more, fewer, or different analyses.

In FIG. 4, the compaction analyses 442 include a stroke analysis 444 and a normality angle analysis 446. The stroke analysis 444 determines stroke data for each vector field analyzed. For example, in a particular implementation, the stroke data indicates a stroke value required for the roller (or each individual roller of a segmented roller) to apply sufficient compaction force to a respective tow. Additionally, or alternatively, the stroke data indicates extremes of the stroke values (e.g., largest stroke values for the roller) or stroke values that are greater than a stroke threshold of the roller deformation thresholds 124 of FIG. 1. In some implementations, the stroke data may identify locations associated with the stroke values that exceed the stroke threshold.

The normality angle analysis 446 determines normality angle data for each vector field analyzed. For example, in a particular implementation, the normality angle data indicates a normality angle at each location for the roller (or each individual roller of a segmented roller). Additionally, or alternatively, the normality angle data indicates extremes of the normality angle value (e.g., a largest normality angle) or normality angle values that are greater than a normality angle threshold of the roller deformation thresholds 124 of FIG. 1. In some implementations, the normality angle data may identify locations associated with the normality angle values that exceed the normality angle threshold.

In FIG. 4, the steering analyses 448 include a radius of curvature analysis 450 and an edge length differential analysis 452. The radius of curvature analysis 450 determines radius of curvature data for each vector field analyzed. For example, in a particular implementation, the radius of curvature data indicates a radius of curvature at each location for each tow. Additionally, or alternatively, the radius of curvature data indicates extremes of the radius of curvature value (e.g., a smallest radius of curvature) or radius of curvature values that are less than a curvature threshold. In some implementations, the radius of curvature data may identify locations associated with the radius of curvature values that fail to satisfy the curvature threshold.

The edge length differential analysis 452 determines edges lengths of each tow and generates edge length differential data. The edge length differential data indicates how much longer (or shorter) one edge of a tow is as compared to the other edge. In some implementations, the edge length differential data is for a specified length of the tow, such as 1 meter along a centerline of the tow. The edge length differential data indicates how much steering the tow has endured and is indicative of differential stresses between the edges. To illustrate, a first edge of a tow may be significantly longer than a second edge of the tow if the first edge has been the outer edge during steering for a greater distance that the second edge has been the outer edge. Such edge length differentials can indicate that one edge is subjected to too much tension and is therefore likely to delaminate, or that the other edge is subjected to too little tension and is therefore likely to pucker or fold. In some implementations, the edge length differential data indicates extremes of the edge length differential values (e.g., a largest edge length differential value) or edge length differential values that exceed an edge length differential threshold. In some implementations, the edge length differential data identify locations associated with the edge length differential values that fail to satisfy the edge length differential threshold.

The angle deviation analysis 454 determines fiber angle deviation data for each vector field analyzed. For example, in a particular implementation, the fiber angle deviation data indicates deviation from the nominal fiber angle at each triangle of the surface triangulation (e.g., for each ply). Additionally, or alternatively, the fiber angle deviation data indicates extremes of fiber angle deviation within a course. For example, the fiber angle deviation data may identify locations that are associated with the largest fiber angle deviation or locations associated with particular ranges of fiber angle deviation. As another example, the fiber angle deviation data may identify locations associated with the fiber angle deviations that exceed a threshold, such as the tow nominal-angle deviation threshold 126 of FIG. 1.

The gap/lap analysis 456 determines gap data, lap data, or both, (referred to herein as "gap/lap data") for each vector field analyzed. For example, in a particular implementation, the gap/lap data indicates locations and/or sizes of gaps, laps, or both, for one or more plies. Additionally, or alternatively, the gap/lap data summarizes gap and/or lap information for a ply or for the entire 3D model. For example, the gap/lap data indicates an average or range of overlap or gap values for a particular ply or for the entire 3D model. To illustrate, a percentage of surface area of a ply that is associated with gaps or laps can be used to indicate an average gap or lap for the ply. As another example, the gap/lap data identifies one or more locations associated with gap/lap data that exceed a threshold, such as the tow overlap threshold 122 of FIG. 1.

The number of tows limit analysis 458 determines tow count data indicating a number of tows that can be applied per course (e.g., in a single pass) at various locations for each vector field analyzed. For example, in a particular implementation, the tow count data indicates the number of tows that can be applied at each location based on results of one more of the other analyses of block 440. As explained with reference to FIG. 3, the number of tows that can be applied at a particular location depends on compaction 334, steering 324, course convergence 326, other factors, or a combination thereof. In some implementations, the tow count data indicates an average or range of tow counts for a particular course of a particular ply. In some implementations, the tow count data identifies locations associated with the tow counts that are below a threshold, such as the tow count threshold 120 of FIG. 1.

Results of the analysis or analyses performed at block 440 are used to generate the outputs 404. In FIG. 4, the outputs 404 include recommendations 460, statistics 462, visualizations 464, or a combination thereof. In other implementations, the outputs 404 include more, fewer, or different outputs. For example, in some implementations, the statistics 462 are merged with the visualizations 464.

The recommendations 460 include suggestions for decreasing manufacturing time of a part based on the 3D model within defined constraints, such as the fiber angle deviation constraints. As an example, generally, factors that decrease manufacturing time include: applying more tows in each pass, decreasing off-part motion, and decreasing rework and inspection. The recommendations 460 may be directed, based on the analysis of block 440, to one or more of these manufacturing-time reducing factors. To illustrate, if the number of tows limit analysis 458 indicates that fewer than a target number of tows can be applied at a particular location in a single pass, the compaction analyses 442 and the stroke analyses 444 for the particular location may be evaluated to determine which is limiting the number of tows in the particular location. In this example, the recommendations 460 may suggest changes to address the limitation on the number of tows that can be applied at the particular location. For example, if the compaction analyses 442 are indicated as limiting the number of tows, the recommendations 460 may suggest modifying a shape or contour of the 3D model (e.g., to a less extreme contour) to reduce effects of stroke or normality angle on the number of tows that can be applied in a single pass. As another example, if the steering analyses 448 are indicated as limiting the number of tows, the recommendations 460 may suggest evaluating an alternative course centerline strategy. As another example, if the AFP machine 170 can use multiple different rollers with different roller compaction parameters, the recommendations 460 may include data indicating multiple values of the number of tows that can be applied during a single pass, where each value is associated with a particular roller.

The statistics 462 summarize results of one or more of the analyses 442, 448, 454, 456, 458. For example, the statistics 462 may indicate a count of the number of tows that can be applied in a single pass for a particular ply or for the entire 3D model. To illustrate, the statistics 462 may indicate the smallest number of tows that can be applied at any location of the 3D model in a single pass, the largest number of tows that can be applied at any location of the 3D model in a single pass, the average number of tows that can be applied in a single pass for the 3D model, or other data summarizing results of the number of tows limit analysis 458. As another example, the statistics 462 may indicate a largest or average angle deviation for a ply or for the 3D model.

The visualizations 464 display results of one or more of the analyses 442, 448, 454, 456, 458 as a visually distinct location on a representation of the 3D model. Several examples of such visualizations 464 are shown in the figures.

Figure 6C:
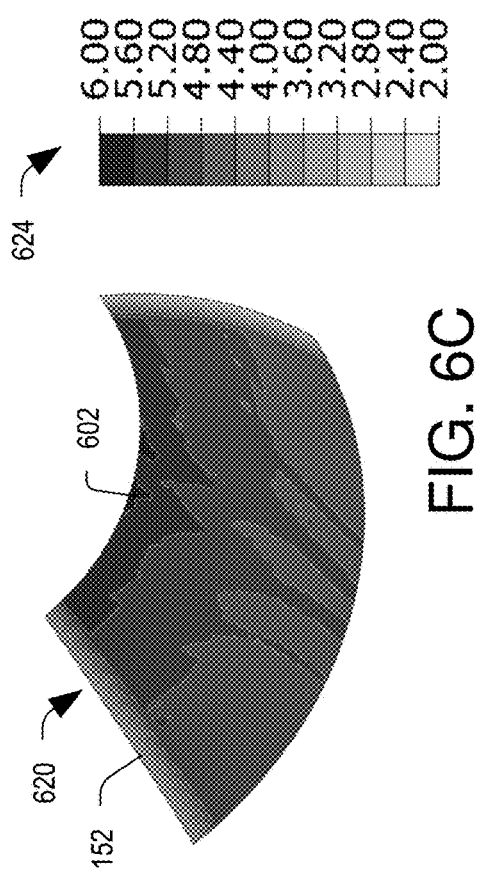
FIG. 6C is a diagram that illustrates another example of a portion of a display of a 3D model of an object with visually distinct locations associated with layup strategy analysis results related to roller compaction.
Figure 6D:
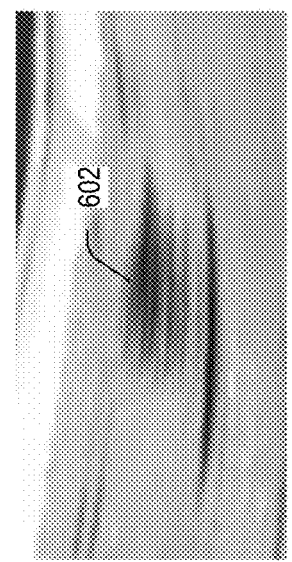
FIG. 6D is an image that illustrates an example of a physical instance of the object of FIG. 6C.
Figure 6A:
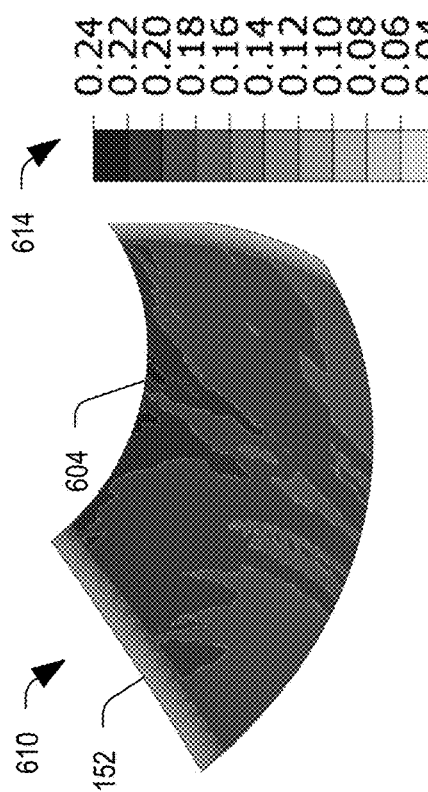
FIG. 6A is a diagram that illustrates an example of a portion of a display of a 3D model of an object with visually distinct locations associated with layup strategy analysis results related to roller compaction.
Figure 6B:
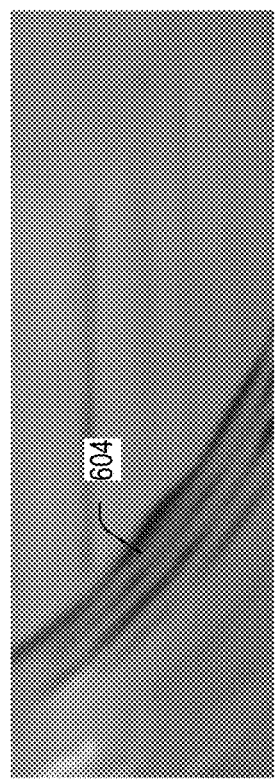
FIG. 6B is an image that illustrates an example of a physical instance of the object of FIG. 6A.

For example, FIGS. 6A and 6C illustrate examples of visualizations based, at least partly, on the compaction analyses 442. Each of the visualizations of FIGS. 6A and 6C includes a representation of the 3D model 152 and a key. The representation of the 3D model 152 includes a plurality of visually distinct regions (indicated by various fill patterns), and the key indicates the meanings (e.g., relevant data values) associated with the various fill patterns FIG. 6A illustrates a visualization 610 based on the stroke analysis 444. A key 614 associated with the visualization 610 indicates that the fill patterns are associated with tow stroke in inches. For example, a largest stroke value in FIG. 6A is 0.24 inches, and a smallest stroke value in FIG. 6A is 0.04 inches. Matching FIG. 6A to FIG. 6D, the bridged tows 602 in FIG. 6D may be associated with the largest stroke value in the visualization 620.

FIG. 6C illustrates a visualization 620 based on the normality angle analysis 446. A key 624 in FIG. 6C indicates that the fill patterns represent the normality angle (e.g., in degrees) in each of the visually distinct regions. Matching FIG. 6C to FIG. 6B, the lifted tows 604 in FIG. 6B may be associated with the highest normality angle in the visualization 610.

FIGS. 9A and 9B illustrate examples of visualizations based, at least partly, on the angle deviation analysis 454. Each visualization of FIGS. 9A and 9B includes a representation of the 3D model 152 and a key. The representation of the 3D model 152 includes a plurality of visually distinct regions (indicated by various fill patterns), and the key indicates the meanings (e.g., relevant data values) associated with the various fill patterns.

FIG. 9A illustrates a visualization 902 for a 45 degree ply of another example of the 3D model 152. In FIG. 9A, a key 912 indicates a count of a number of tows that can be applied in each region without exceeding a specified fiber angle deviation threshold (e.g., 1 degree in the example illustrated). To illustrate, in some regions a course can include 16 tows; whereas, in other regions a course can only include 8 tows.

FIG. 9B illustrates a visualization 952 for a 45 degree ply of another example of the 3D model 152. In FIG. 9B, a key 954 indicates values of the differential angle (e.g., the absolute value of the difference between the nominal fiber angle and the actual fiber angle) associated with each visually distinct region of the 3D model 152. The key 954 also indicates a fiber angle deviation threshold 956 (e.g., the tow nominal-angle deviation threshold 126) enabling a user to quickly identify portions of the 3D model that are associated with fiber angles that do not satisfy (e.g., are greater than) the fiber angle deviation threshold 956, such as portions of a region 1058. In some implementations, the visualization 952 of FIG. 9B may visually distinguish locations at which the tow nominal-angle deviation threshold 126 is not satisfied for a particular count of tows that can be simultaneously applied during the single pass.

FIG. 11A illustrates an example of a visualization based, at least partly, on the steering analyses 448. The visualization of FIG. 11A includes a representation 1100 of an example of the 3D model 152 and a key 1102. The representation of the 3D model 152 includes a plurality of visually distinct regions (indicated by various fill patterns), and the key 1102 indicates the meanings (e.g., relevant data values) associated with the various fill patterns. In FIG. 11A, each fill pattern indicates a radius of curvature (e.g., in inches). Thus, a smaller value in the key 1102 corresponds to a smaller radius of curvature or a tighter turn. Regions of high curvature (e.g., smaller radius of curvature) may be associated with puckering (as illustrated in FIG. 11B) or buckling (as illustrated in FIG. 11C).

Figure 12B:
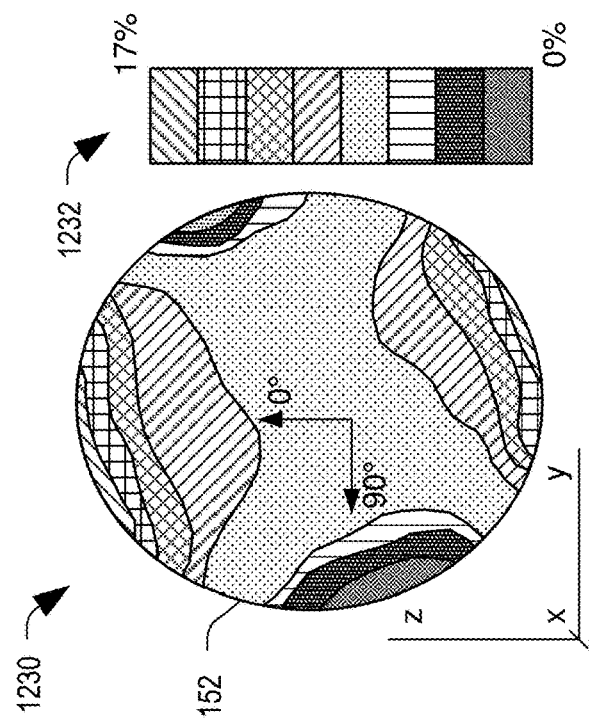
FIG. 12B is a diagram that illustrates an example of a portion of a display of a 3D model of an object with visually distinct locations associated with layup strategy analysis results related to gaps and laps.
Figure 12A:
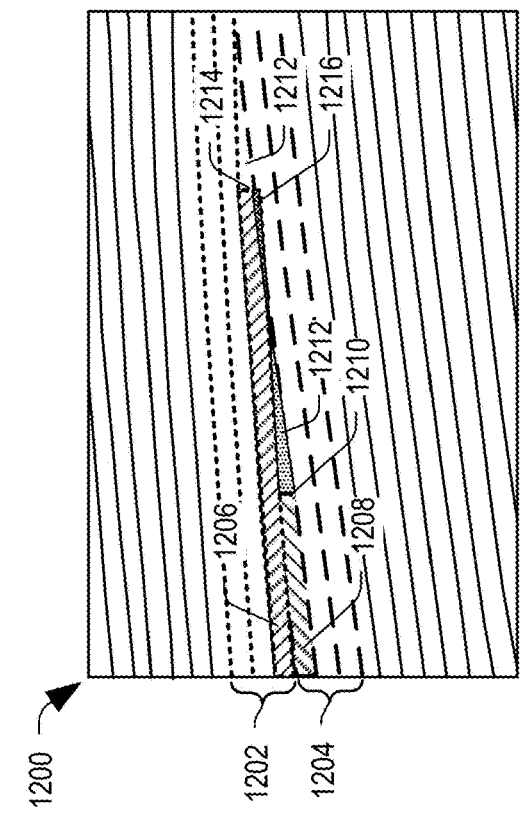
FIG. 12A is a diagram that illustrates an example of adding or dropping tows due to course convergence.

FIG. 12B illustrates an example of a visualization based, at least partly, on the gap/lap analysis 456. The visualization of FIG. 12B includes a representation 1230 of an example of the 3D model 152 and a key 1232. The representation 1230 of the 3D model 152 includes a plurality of visually distinct regions (indicated by various fill patterns), and the key 1232 indicates that the various fill patterns are associated with respective percentages of overlap along an X axis. In a particular implementation, if a tow overlap threshold 122 is specified, the visualization of FIG. 12B may indicate a number of tows that can be simultaneously applied during a single pass while satisfying the tow overlap threshold 122.

Figure 13A:
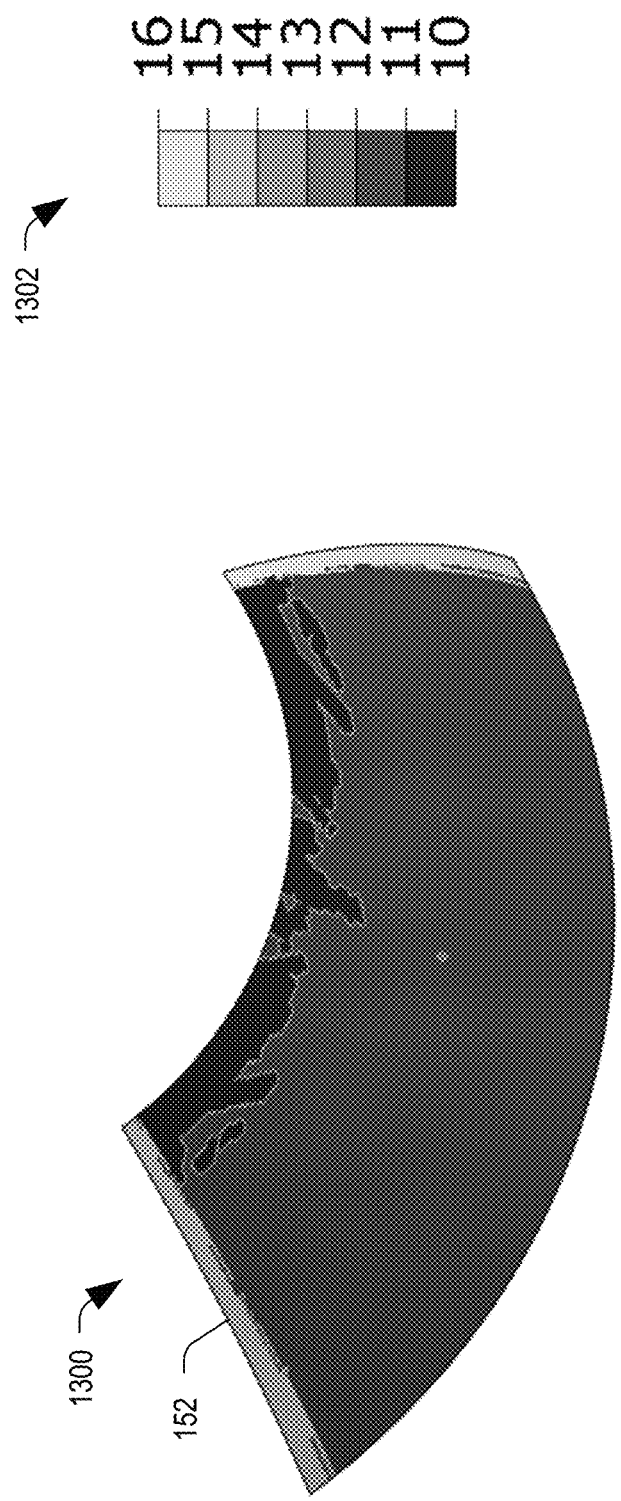

FIG. 13A illustrates an example of a visualization based, at least partly, on the number of tows limit analysis 458 for a layer in the composite part that has a 0 degree nominal fiber angle. FIG. 13B illustrates a visualization of the same number of tow limit analysis as the visualization of FIG. 13A for a layer that has a nominal fiber angle of 45 degrees. In FIG. 13A, the visualization includes a representation 1300 of an example of the 3D model 152 and a key 1302. The representation 1300 of the 3D model 152 includes a plurality of visually distinct regions (indicated by various fill patterns), and the key 1302 indicates that the various fill patterns are associated with counts of a number of tows that can be applied in each region in a single pass. In FIG. 13B, the representation 1320 of the 3D model 152 includes a plurality of visually distinct regions that are approximately scaled to represent course widths, and each course width is associated with a value indicating the number of tows in the course. For example, in a first region 1310, each course can include up to 10 tows; whereas in a second region 1312, each course can include up to 16 tows.

The visualizations described above enable production of laminates that have higher quality with less rework and faster manufacturing timelines. For example, the visualizations illustrate the impact of various part or manufacturing design choices, enabling a user to quickly and easily modify the 3D model 152 or parameters 138 associated with the manufacturing process to improve manufacturability of the object 190.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A system comprising:
 a Numerical Control (NC) programming tool;
 an Automated Fiber Placement (AFP) machine;
 a layup strategy analysis tool comprising:
  a memory storing layup strategy analysis instructions; and
  one or more processors configured to execute the layup strategy analysis instructions to:
   obtain model data representing a three-dimensional (3D) model of an object to be formed using an automated fiber placement process;
   obtain process data descriptive of the automated fiber placement process and one or more automated fiber placement machines, wherein the process data specifies a tow overlap threshold;
   generate output indicating a count of a number of tows that can be simultaneously applied during a single pass based on a geometry of the object and based on manufacturability constraints indicated by the process data, wherein the process data specifies a roller compaction parameter associated with a particular automated fiber placement machine of the one or more automated fiber placement machines, wherein the process data specifies a tow nominal-angle deviation threshold, wherein the number of tows that can be simultaneously applied during a single pass is further based on the tow overlap threshold, the roller compaction parameter, and the tow nominal-angle deviation threshold; and
   based on the generated output indicating the number of tows that can be simultaneously applied during a single pass based on the geometry of the object, provide data descriptive of a selected layup strategy to the NC programming tool that uses NC instructions to generate machine instruction data detailing specific operations to be performed to manufacture the object; and
  wherein the AFP machine is configured to manufacture the object based on the machine instruction data.

2. The system of claim 1, wherein the one or more automated fiber placement machines include the AFP machine.

3. The system of claim 1, wherein the roller compaction parameter indicates a stroke parameter for a set of rollers of the particular automated fiber placement machine, wherein the number of tows that can be applied during the single pass is limited by a minimum compaction pressure that the set of rollers can apply across a width of the set of rollers during the single pass, and wherein the minimum compaction pressure is based on the stroke parameter.

4. The system of claim 1, wherein the roller compaction parameter indicates a normality angle parameter for a particular roller of the particular automated fiber placement machine, wherein the number of tows that can be applied during the single pass is limited by a compaction area of the particular roller and a shear force applied to a tow by the particular roller, and wherein the compaction area and the shear force are based on the normality angle parameter.

5. The system of claim 1, wherein the output includes a depiction of the 3D model of the object displayed in a manner that visually distinguishes locations at which a roller compaction threshold is not satisfied for a particular count of tows that can be simultaneously applied during the single pass.

6. The system of claim 5, wherein the output further indicates an alternative number of tows that can be applied during the single pass to satisfy the roller compaction threshold.

7. The system of claim 1, wherein the process data specifies roller compaction parameters associated with a plurality of available rollers, and wherein the output indicates multiple values of the number of tows that can be applied during a single pass, each value associated with a particular roller of the plurality of available rollers.

8. The system of claim 1, wherein the process data specifies a steering radius parameter associated with a particular tow material, and wherein the number of tows that can be applied during a single pass is further based on the steering radius parameter.

9. The system of claim 8, wherein the output includes a depiction of the 3D model of the object displayed in a manner that visually distinguishes locations at which the steering radius parameter is not satisfied for a particular count of tows that can be simultaneously applied during the single pass.

10. The system of claim 8, wherein the steering radius parameter is based on tow width of the tows.

11. The system of claim 1, wherein the one or more processors are further configured to obtain a tow count threshold indicating a constraint on a minimum number of tows to be applied simultaneously, and wherein the output indicates portions of the object where the count of the number of tows that can be applied during the single pass fails to satisfy the tow count threshold.

12. The system of claim 11, wherein the output includes a depiction of the 3D model of the object displayed in a manner that visually distinguishes locations at which the tow count threshold is not satisfied.

13. The system of claim 1, wherein the output includes a depiction of the 3D model of the object displayed in a manner that visually distinguishes counts of the number of tows that can be applied during the single pass at various locations.

14. The system of claim 1, wherein the AFP machine includes one or more rollers, one or more steering mechanisms, and one or more heaters, and wherein the machine instruction data identifies a plurality of operations to be performed by the one or more rollers, the one or more steering mechanisms, or the one or more heaters to manufacture the object.

15. The system of claim 1, wherein the AFP machine includes a plurality of rollers, wherein a first roller of the plurality of rollers corresponds to a first set of compaction parameters, wherein a second roller of the plurality of rollers corresponds to a second set of compaction parameters, and wherein the machine instruction data identifies a particular roller of the plurality of rollers to create a particular tow.

16. A system comprising:
 a Numerical Control (NC) programming tool;
 an Automated Fiber Placement (AFP) machine;
 a layup strategy analysis tool comprising:
  a memory storing layup strategy analysis instructions; and
  one or more processors configured to execute the layup strategy analysis instructions to:
   obtain model data representing a three-dimensional (3D) model of an object to be formed using an automated fiber placement process;
   obtain process data descriptive of the automated fiber placement process and one or more automated fiber placement machines, wherein the process data specifies a tow overlap threshold;
   generate output indicating a count of a number of tows that can be simultaneously applied during a single pass based on a geometry of the object and based on manufacturability constraints indicated by the process data, wherein the process data specifies a roller compaction parameter associated with a particular automated fiber placement machine of the one or more automated fiber placement machines, wherein the process data specifies a steering radius parameter associated with a particular tow material, and wherein the number of tows that can be simultaneously applied during a single pass is further based on the tow overlap threshold, the roller compaction parameter, and the steering radius parameter; and
   based on the generated output indicating the number of tows that can be simultaneously applied during a single pass based on the geometry of the object, provide data descriptive of a selected layup strategy to the NC programming tool that uses NC instructions to generate machine instruction data detailing specific operations to be performed to manufacture the object; and
 wherein the AFP machine is configured to manufacture the object based on the machine instruction data.

17. The system of claim 16, wherein the process data specifies a tow nominal-angle deviation threshold, and wherein the number of tows that can be simultaneously applied during a single pass is further based on the tow nominal-angle deviation threshold.

18. The system of claim 17, wherein the output includes a depiction of the 3D model of the object displayed in a manner that visually distinguishes locations at which the tow nominal-angle deviation threshold is not satisfied for a particular count of tows that can be simultaneously applied during the single pass.

19. The system of claim 18, wherein the output further indicates an alternative number of tows that can be applied during the single pass to satisfy the tow nominal-angle deviation threshold.

20. A method of manufacturing an object comprising:
 obtaining, at one or more processors of a computing device, model data representing a three-dimensional (3D) model of an object to be formed using an automated fiber placement process;
 obtaining, at the one or more processors, process data descriptive of the automated fiber placement process and one or more automated fiber placement machines, wherein the process data specifies a tow nominal-angle deviation threshold;
 performing, by the one or more processors, an analysis of the model data and the process data to determine a count of a number of tows that can be simultaneously applied during a single pass based on a geometry of the object and based on constraints indicated by the process data, wherein the process data specifies a roller compaction parameter associated with a particular automated fiber placement machine of the one or more automated fiber placement machines, wherein the roller compaction parameter indicates a normality angle parameter for a particular roller of the particular automated fiber placement machine, wherein the number of tows that can be applied during the single pass is limited by a compaction area of the particular roller and a shear force applied to a tow by the particular roller, wherein the compaction area and the shear force are based on the normality angle parameter, wherein the number of tows that can be simultaneously applied during a single pass is further based on the tow nominal-angle deviation threshold and the roller compaction parameter;

generating, by the one or more processors, output based on the analysis, wherein the output includes a depiction of the 3D model of the object displayed in a manner that visually distinguishes problem locations of the 3D model based on differing analysis results associated with each location;

based on the generated output indicating the number of tows that can be simultaneously applied during a single pass based on the geometry of the object, providing data descriptive of a selected layup strategy to a Numerical Control (NC) programming tool that uses NC instructions to generate machine instruction data detailing specific operations to be performed by an Automated Fiber Placement (AFP) machine to manufacture the object; and manufacturing the object by the AFP machine based on the machine instruction data.

21. The method of claim 20, wherein the process data specifies a tow overlap threshold, and wherein the number of tows that can be simultaneously applied during a single pass is further based on the tow overlap threshold.

22. The method of claim 20, wherein the output further indicates an alternative number of tows that can be applied during the single pass to satisfy the tow nominal-angle deviation threshold.

23. The method of claim 20, wherein the process data specifies a steering radius parameter associated with a particular tow material, and wherein the number of tows that can be applied during a single pass is further based on the steering radius parameter.

* * * * *